US012447099B2

(12) United States Patent
Wersland et al.

(10) Patent No.: US 12,447,099 B2
(45) **Date of Patent: *Oct. 21, 2025**

(54) PORTABLE PERCUSSIVE MASSAGE DEVICE

(71) Applicant: Therabody, Inc., Los Angeles, CA (US)

(72) Inventors: Jason Wersland, Los Angeles, CA (US); Benjamin Nazarian, Beverly Hills, CA (US); Jaime Sanchez Solana, Los Angeles, CA (US); Eduardo Merino, Los Angeles, CA (US)

(73) Assignee: Therabody, Inc., Los Angeles, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/507,871

(22) Filed: Nov. 13, 2023

(65) Prior Publication Data

US 2024/0148605 A1 May 9, 2024

Related U.S. Application Data

(63) Continuation of application No. 17/833,412, filed on Jun. 6, 2022, now Pat. No. 11,813,221, which is a
(Continued)

(51) Int. Cl.
*A61H 23/00* (2006.01)
*A61H 23/02* (2006.01)

(52) U.S. Cl.
CPC ..... *A61H 23/006* (2013.01); *A61H 2023/002* (2013.01); *A61H 23/0254* (2013.01); *A61H 2201/0153* (2013.01)

(58) Field of Classification Search
CPC .... A61H 23/00; A61H 23/002; A61H 23/004; A61H 23/006; A61H 23/0254;
(Continued)

(56) References Cited

U.S. PATENT DOCUMENTS 657,765 A 9/1900 Gibbs
675,772 A 6/1901 Ferguson
(Continued)

FOREIGN PATENT DOCUMENTS

AT 510048 A1 1/2012
AU 2019204770 B1 10/2019
(Continued)

OTHER PUBLICATIONS

Amazon: "OIVO Xbox One Controller Charger Dual Charging Station Updated Strap, Remote Charger Dock-2 Rechargeable Battery Packs Included," OIVO, Sep. 6, 2018, Especially annotated figures, Retrieved from Entire Document, 11 Pages.
(Continued)

*Primary Examiner* — Joseph D. Boecker
*Assistant Examiner* — Brian T Khong
(74) *Attorney, Agent, or Firm* — Sterne, Kessler, Goldstein & Fox P.L.L.C.

(57) ABSTRACT

A percussive massage device may include a housing having a housing interior. A motor may be positioned in the housing interior and may include a rotatable motor shaft having a motor axis. A battery may be positioned in the housing interior. A switch may be configured to activate the motor. A reciprocating shaft may operatively be connected to the rotatable motor shaft. The reciprocating shaft may include a distal end and is able to reciprocate in response to rotation of the rotatable motor shaft. A vent may extend through a vent opening in the housing to provide ventilation to the housing interior.

21 Claims, 8 Drawing Sheets

Related U.S. Application Data continuation-in-part of application No. 17/515,008, filed on Oct. 29, 2021, now abandoned, which is a continuation of application No. 16/824,328, filed on Mar. 19, 2020, now Pat. No. 10,945,915, and a continuation of application No. 17/190,955, filed on Mar. 3, 2021, now Pat. No. 11,160,723, said application No. 16/824,328 is a continuation-in-part of application No. 29/708,815, filed on Oct. 9, 2019, now Pat. No. Des. 951,470.

(60) Provisional application No. 62/899,098, filed on Sep. 11, 2019, provisional application No. 62/844,424, filed on May 7, 2019.

(58) Field of Classification Search
CPC ............ A61H 23/0263; A61H 23/0218; A61H 23/008; A61H 2201/0153; A61H 2201/0157; A61H 2201/0165; A61H 2201/1669; A61H 2201/1671; A61H 2201/1664; A61H 2201/1657; A61H 7/001; A61H 7/002; A61H 7/003; A61H 7/004; A61H 7/005; A61H 9/00; A61H 9/0007; A61H 9/0021; A61H 1/008
See application file for complete search history.

(56) References Cited

U.S. PATENT DOCUMENTS

| | | | |
|---|---|---|---|
| 1,545,027 | A | 7/1925 | Ashlock |
| 1,594,636 | A | 8/1926 | Smith |
| 1,657,765 | A | 1/1928 | Pasque |
| 1,784,301 | A | 12/1930 | Mekler |
| D91,454 | S | 2/1934 | Decker |
| D93,943 | S | 11/1934 | Harry |
| 2,179,594 | A | 11/1939 | Johnson |
| D118,980 | S | 2/1940 | Gilbert |
| D129,045 | S | 8/1941 | Glenn |
| 2,391,671 | A | 12/1945 | Berg |
| D143,678 | S | 1/1946 | Snyder et al. |
| 2,475,861 | A | 7/1949 | Alfred |
| D161,484 | S | 1/1951 | Curtis |
| D163,324 | S | 5/1951 | Charles |
| 2,550,775 | A | 5/1951 | Clark |
| D180,923 | S | 9/1957 | Nicholas |
| D181,742 | S | 12/1957 | Alfred |
| 2,931,632 | A | 4/1960 | De et al. |
| 2,987,334 | A | 6/1961 | Wendling |
| 3,053,559 | A | 9/1962 | Norval |
| 3,077,837 | A | 2/1963 | Sidney et al. |
| D195,145 | S | 4/1963 | Robert |
| D197,142 | S | 12/1963 | James |
| 3,172,675 | A | 3/1965 | Gonzalez |
| D207,505 | S | 4/1967 | Whitman |
| 3,452,226 | A | 6/1969 | Hettich |
| 3,545,301 | A | 12/1970 | Richter |
| 3,626,934 | A | 12/1971 | Andis |
| 3,699,952 | A | 10/1972 | Waters et al. |
| 3,705,579 | A | 12/1972 | Morini et al. |
| D230,522 | S | 2/1974 | Norman |
| D237,454 | S | 11/1975 | James |
| D237,455 | S | 11/1975 | Schramm |
| 3,942,251 | A | 3/1976 | Griffies et al. |
| 3,968,789 | A | 7/1976 | Simoncini |
| 4,031,763 | A | 6/1977 | Eisenberg |
| 4,046,142 | A | 9/1977 | Whitney |
| 4,088,128 | A | 5/1978 | Mabuchi |
| 4,150,668 | A | 4/1979 | Johnston |
| 4,158,246 | A | 6/1979 | Meadows et al. |
| 4,173,217 | A | 11/1979 | Johnston |
| 4,203,431 | A | 5/1980 | Abura et al. |
| D265,985 | S | 8/1982 | House |
| 4,506,159 | A | 3/1985 | Reuter et al. |
| 4,513,737 | A | 4/1985 | Mabuchi |
| 4,533,796 | A | 8/1985 | Engelmore |
| 4,549,535 | A | 10/1985 | Wing |
| 4,565,189 | A | 1/1986 | Mabuchi |
| 4,566,442 | A | 1/1986 | Mabuchi et al. |
| 4,596,406 | A | 6/1986 | Van Vleet et al. |
| D287,814 | S | 1/1987 | Hiraishi et al. |
| 4,691,693 | A | 9/1987 | Sato |
| 4,692,958 | A | 9/1987 | McMakin |
| D292,368 | S | 10/1987 | Mikiya |
| 4,730,605 | A | 3/1988 | Noble et al. |
| D300,132 | S | 3/1989 | Culbertson et al. |
| 4,815,224 | A | 3/1989 | Miller |
| 4,841,955 | A | 6/1989 | Evans et al. |
| D303,373 | S | 9/1989 | Ching, Jr. |
| D310,005 | S | 8/1990 | Precht |
| D314,320 | S | 2/1991 | Brosius et al. |
| 4,989,613 | A | 2/1991 | Finkenberg |
| 4,991,298 | A | 2/1991 | Matre |
| 5,014,681 | A | 5/1991 | Heeman et al. |
| D320,379 | S | 10/1991 | Culbertson |
| D321,338 | S | 11/1991 | Sakamoto et al. |
| 5,085,207 | A | 2/1992 | Fiore |
| 5,088,474 | A | 2/1992 | Mabuchi et al. |
| 5,092,317 | A | 3/1992 | Zelikovski |
| 5,103,809 | A | 4/1992 | DeLuca et al. |
| 5,123,139 | A | 6/1992 | Leppert et al. |
| D329,166 | S | 9/1992 | Doggett |
| D329,291 | S | 9/1992 | Wollman |
| D329,292 | S | 9/1992 | Wollman |
| D331,467 | S | 12/1992 | Wollman |
| D334,012 | S | 3/1993 | Chen |
| 5,201,149 | A | 4/1993 | Eisenblatter |
| 5,207,697 | A | 5/1993 | Carusillo et al. |
| 5,212,887 | A | 5/1993 | Farmerie |
| D338,802 | S | 8/1993 | Maass |
| D345,077 | S | 3/1994 | Maass |
| D345,727 | S | 4/1994 | Flowers et al. |
| D345,888 | S | 4/1994 | Joss et al. |
| D349,029 | S | 7/1994 | Matsunaga et al. |
| 5,417,644 | A | 5/1995 | Lee |
| D363,352 | S | 10/1995 | Huen |
| D367,712 | S | 3/1996 | Young |
| 5,501,657 | A | 3/1996 | Feero |
| D374,934 | S | 10/1996 | Lie |
| 5,569,168 | A | 10/1996 | Hartwig |
| 5,573,500 | A | 11/1996 | Katsunuma et al. |
| 5,656,017 | A | 8/1997 | Keller et al. |
| 5,656,018 | A | 8/1997 | Tseng |
| D383,366 | S | 9/1997 | Heck |
| D383,435 | S | 9/1997 | Svetlik |
| D384,639 | S | 10/1997 | Kawakami et al. |
| D387,728 | S | 12/1997 | Kawakami et al. |
| D388,175 | S | 12/1997 | Lie |
| D397,991 | S | 9/1998 | Kawakami et al. |
| D400,161 | S | 10/1998 | Nagele et al. |
| D400,758 | S | 11/1998 | Hippen et al. |
| 5,860,669 | A | 1/1999 | Wass et al. |
| D408,543 | S | 4/1999 | Back |
| 5,910,197 | A | 6/1999 | Chaconas |
| 5,925,002 | A | 7/1999 | Wollman |
| D412,485 | S | 8/1999 | Kato et al. |
| 5,935,089 | A | 8/1999 | Shimizu |
| 5,951,501 | A | 9/1999 | Griner |
| D417,648 | S | 12/1999 | Clowers et al. |
| 6,003,052 | A | 12/1999 | Yamagata |
| 6,006,631 | A | 12/1999 | Miner et al. |
| D425,014 | S | 5/2000 | Willkens et al. |
| D430,774 | S | 9/2000 | Naft et al. |
| D430,938 | S | 9/2000 | Lee |
| D432,077 | S | 10/2000 | Zurwelle et al. |
| D433,300 | S | 11/2000 | Buck |
| 6,146,383 | A | 11/2000 | Studer et al. |
| 6,165,145 | A | 12/2000 | Noble |
| D439,984 | S | 4/2001 | Thach |
| D440,136 | S | 4/2001 | Buck |
| 6,227,959 | B1 | 5/2001 | Beaudry |
| 6,228,042 | B1 | 5/2001 | Dungan |
| 6,228,120 | B1 | 5/2001 | Leonard et al. |
| 6,245,031 | B1 | 6/2001 | Pearson |

(56) References Cited

U.S. PATENT DOCUMENTS 6,290,660 B1 9/2001 Epps et al.
D448,852 S 10/2001 Engelen
6,401,289 B1 6/2002 Herbert
6,406,445 B1 6/2002 Ben-Nun
6,432,072 B1 8/2002 Harris et al.
6,479,752 B1 11/2002 Neuroth et al.
6,537,236 B2 3/2003 Tucek et al.
6,539,328 B1 3/2003 Cremonese et al.
D474,445 S 5/2003 Matsuoka et al.
6,558,338 B1 5/2003 Wasserman
6,568,089 B1 5/2003 Popik et al.
D475,595 S 6/2003 Hatch et al.
D475,679 S 6/2003 Cooper et al.
D476,746 S 7/2003 Harris et al.
6,599,250 B2 7/2003 Webb et al.
6,599,260 B2 7/2003 Tucek et al.
D478,385 S 8/2003 Dirks et al.
D481,279 S 10/2003 Buck
6,663,657 B1 12/2003 Miller
6,682,496 B1 1/2004 Pivaroff
6,715,781 B1 4/2004 Smith
6,723,050 B2 4/2004 Dow et al.
6,723,060 B2 4/2004 Miller
6,758,826 B2 7/2004 Luettgen et al.
6,805,700 B2 10/2004 Miller
6,823,762 B2 11/2004 Hu
6,846,295 B1 1/2005 Ben-Nun
D504,111 S 4/2005 Ozawa et al.
D510,317 S 10/2005 Sun
6,994,575 B1 2/2006 Clark et al.
7,041,072 B2 5/2006 Calvert
D530,270 S 10/2006 Ozawa et al.
7,128,721 B2 10/2006 Ferber et al.
D531,733 S 11/2006 Burout, III et al.
7,169,169 B2 1/2007 Tucek et al.
7,223,250 B2 5/2007 Brattesani et al.
D544,102 S 6/2007 Pivaroff
D544,436 S 6/2007 Kawahara et al.
D547,264 S 7/2007 Kondo
D553,252 S 10/2007 Masuda
D553,562 S 10/2007 Okada et al.
7,384,405 B2 6/2008 Rhoades
D575,224 S 8/2008 Taniguchi et al.
7,431,706 B2 10/2008 Louis
D579,868 S 11/2008 Harrison
D580,353 S 11/2008 Harrison et al.
7,470,081 B2 12/2008 Miyahara et al.
D587,977 S 3/2009 Waldron
7,497,639 B2 3/2009 Lebot et al.
7,503,923 B2 3/2009 Miller
D593,204 S 5/2009 Manke et al.
7,549,966 B2 6/2009 Fujii et al.
D597,482 S 8/2009 Kondo et al.
D604,235 S 11/2009 Tarter
D605,586 S 12/2009 Tong
D606,192 S 12/2009 Summerer et al.
7,731,672 B2 6/2010 Chiang
7,740,249 B1 6/2010 Gao
D622,660 S 8/2010 Taniguchi et al.
7,857,729 B2 12/2010 Sullivan et al.
D631,315 S 1/2011 Xue et al.
7,877,880 B2 2/2011 Royle
7,927,259 B1 4/2011 Rix
7,927,294 B2 4/2011 Kamimura et al.
7,946,977 B2 5/2011 Klearman et al.
7,963,717 B2 6/2011 Seger
7,996,996 B2 8/2011 Hirabayashi
D649,657 S 11/2011 Petersen et al.
D658,759 S 5/2012 Marescaux et al.
D659,644 S 5/2012 Gretz
D666,303 S 8/2012 Ding et al.
8,313,450 B2 11/2012 Ben-Nun
8,342,187 B2 1/2013 Kalman et al.
D682,195 S 5/2013 Aglassinger
8,435,194 B2 5/2013 Dverin et al.
8,479,616 B2 7/2013 Tsai
8,517,895 B2 8/2013 Shalev et al.
8,622,943 B2 1/2014 Ben-Nun
8,646,348 B2 2/2014 Hung
D703,337 S 4/2014 Fuhr et al.
D703,480 S 4/2014 Lownds
8,695,461 B2 4/2014 Moss et al.
D706,433 S 6/2014 Fuhr et al.
D708,742 S 7/2014 Dallemagne et al.
8,770,882 B2 7/2014 Ersoy
8,777,881 B2 7/2014 Tsai
8,864,143 B2 10/2014 Lin
8,870,796 B2 10/2014 Hoffmann
D722,016 S 2/2015 Beukema
8,945,104 B2 2/2015 Boone, III et al.
8,951,216 B2 2/2015 Yoo et al.
D726,495 S 4/2015 Ryan
9,017,273 B2 4/2015 Burbank et al.
D734,863 S 7/2015 Hennessey
D735,348 S 7/2015 Hennessey
9,107,486 B2 8/2015 Brewer et al.
9,132,058 B2 9/2015 Imboden et al.
9,138,257 B2 9/2015 Revivo
D740,222 S 10/2015 Tang
9,272,837 B2 3/2016 Linzell
D756,180 S 5/2016 Chen
D759,237 S 6/2016 Heath et al.
D759,238 S 6/2016 Heath et al.
9,364,385 B2 6/2016 Yang
D763,442 S 8/2016 Price et al.
9,416,805 B2 8/2016 Cascolan et al.
D776,612 S 1/2017 Chen et al.
D778,439 S 2/2017 Håkansson et al.
9,597,256 B1 3/2017 Paul
9,677,901 B2 6/2017 Yamamoto
9,744,600 B2 8/2017 Yang et al.
9,872,813 B2 1/2018 Giraud et al.
9,889,066 B2 2/2018 Danby et al.
D817,732 S 5/2018 Rettler
D817,869 S 5/2018 Lee et al.
D819,221 S 5/2018 Lei
9,981,366 B2 5/2018 Todd et al.
D823,478 S 7/2018 Park
10,034,813 B1 7/2018 Silver
D826,418 S 8/2018 Lad
D837,395 S 1/2019 Gan
D838,378 S 1/2019 Cao
D840,547 S 2/2019 Harle et al.
10,201,470 B2 2/2019 Griner
D842,489 S 3/2019 Spewock et al.
D842,491 S 3/2019 Fleming et al.
D843,656 S 3/2019 Zhang et al.
D844,896 S 4/2019 Levi et al.
D847,362 S 4/2019 Tang
D847,364 S 4/2019 Lee et al.
10,252,051 B2 4/2019 Nichols
10,276,844 B2 4/2019 Wackwitz et al.
D847,990 S 5/2019 Kimball
10,314,762 B1 * 6/2019 Marton .............. A61H 23/0254
10,335,345 B2 7/2019 Choe
10,357,425 B2 7/2019 Wersland et al.
D855,822 S 8/2019 Marton et al.
D858,432 S 9/2019 Altenburger
D862,382 S 10/2019 Altenburger
D866,790 S 11/2019 Lee et al.
D867,279 S 11/2019 Altenburger
10,557,490 B2 2/2020 Wersland et al.
D877,351 S 3/2020 Wersland et al.
D880,419 S 4/2020 Hernandez et al.
D880,714 S 4/2020 Wersland et al.
D880,715 S 4/2020 Wersland et al.
D880,716 S 4/2020 Wersland et al.
D884,205 S 5/2020 Zhuang
10,702,448 B2 7/2020 Wersland et al.
D893,738 S 8/2020 Zhuang
10,758,027 B2 9/2020 Skidmore et al.
10,857,064 B2 12/2020 Wersland et al.
10,918,565 B2 2/2021 Wersland et al.
10,940,081 B2 3/2021 Nazarian et al.

(56) References Cited

U.S. PATENT DOCUMENTS 10,945,915 B2 3/2021 Wersland et al.
10,959,674 B2 3/2021 Leaper
10,959,908 B2 3/2021 Lee et al.
10,959,911 B2 3/2021 Wersland et al.
D919,560 S 5/2021 Taniguchi et al.
10,993,874 B1 5/2021 Marton et al.
11,090,221 B1 8/2021 Haddock Dicarlo et al.
11,160,723 B2 11/2021 Wersland et al.
11,357,697 B2 6/2022 Wersland et al.
11,432,994 B2 9/2022 Wersland et al.
11,452,670 B2 9/2022 Wersland et al.
11,478,400 B1 10/2022 Marton et al.
11,478,606 B1 10/2022 English et al.
11,488,592 B2 11/2022 Kim et al.
11,564,860 B2 1/2023 Wersland et al.
11,877,976 B2 * 1/2024 Dai .......................... A61H 1/00
2001/0016697 A1 8/2001 Gorsen
2001/0027280 A1 10/2001 Huang
2002/0082532 A1 6/2002 Tucek et al.
2002/0115947 A1 8/2002 Young
2002/0177795 A1 11/2002 Frye
2002/0183668 A1 12/2002 Huang
2002/0188233 A1 12/2002 Denyes
2003/0009116 A1 1/2003 Luettgen et al.
2003/0014079 A1 1/2003 Tucek
2003/0028134 A1 2/2003 Lev et al.
2003/0094356 A1 5/2003 Waldron
2003/0144615 A1 7/2003 Lin
2003/0195443 A1 10/2003 Miller
2004/0176710 A1 9/2004 Kennedy et al.
2005/0075591 A1 4/2005 Hafemann
2005/0109137 A1 5/2005 Hartmann
2005/0113870 A1 5/2005 Miller
2005/0126018 A1 6/2005 Haas
2005/0131461 A1 6/2005 Tucek et al.
2005/0203445 A1 9/2005 Tsai
2005/0235988 A1 10/2005 Hansen et al.
2005/0252011 A1 11/2005 Neumeier
2006/0025710 A1 2/2006 Schulz et al.
2006/0047315 A1 3/2006 Colloca et al.
2006/0074455 A1 4/2006 Strandberg
2006/0116614 A1 6/2006 Jones et al.
2006/0118841 A1 6/2006 Eliason et al.
2006/0123941 A1 6/2006 Wadge
2006/0192527 A1 8/2006 Kageler et al.
2006/0211961 A1 9/2006 Meyer et al.
2006/0272664 A1 12/2006 O'Dwyer
2007/0129220 A1 6/2007 Bardha
2007/0144310 A1 6/2007 Pozgay et al.
2007/0150004 A1 6/2007 Colloca et al.
2007/0173886 A1 7/2007 Rousso et al.
2007/0179414 A1 8/2007 Imboden et al.
2007/0270727 A1 11/2007 Khorassani Zadeh
2007/0282228 A1 12/2007 Einav et al.
2007/0299464 A1 12/2007 Cruise et al.
2008/0077061 A1 3/2008 Dehli
2008/0097260 A1 4/2008 Tsukada et al.
2008/0103419 A1 5/2008 Adamson
2008/0146980 A1 6/2008 Rousso et al.
2008/0167588 A1 7/2008 Chen
2008/0169715 A1 7/2008 Mills et al.
2008/0177207 A1 7/2008 Liao
2008/0185888 A1 8/2008 Beall et al.
2008/0200849 A1 8/2008 Hollington et al.
2008/0243041 A1 10/2008 Brenner et al.
2008/0306417 A1 12/2008 Imboden et al.
2008/0312568 A1 12/2008 Chen
2008/0314610 A1 12/2008 Meixner
2009/0112134 A1 4/2009 Avni
2009/0188119 A1 7/2009 Oberheim
2009/0270777 A1 10/2009 Wu et al.
2009/0309313 A1 12/2009 Knorr et al.
2009/0326540 A1 12/2009 Estes
2010/0100119 A1 4/2010 Herndon
2010/0137752 A1 6/2010 Heine et al.
2010/0137907 A1 6/2010 Tsai
2010/0145242 A1 6/2010 Tsai
2010/0160841 A1 6/2010 Wu
2010/0162579 A1 7/2010 Naughton et al.
2010/0176919 A1 7/2010 Myers et al.
2010/0204694 A1 8/2010 Mehta et al.
2010/0210194 A1 8/2010 Thomaschewski et al.
2010/0274162 A1 10/2010 Evans
2010/0286569 A1 11/2010 Nagano
2010/0298863 A1 11/2010 Hindinger et al.
2011/0037431 A1 2/2011 Mackle
2011/0055720 A1 3/2011 Potter et al.
2011/0118637 A1 5/2011 Lev et al.
2011/0201979 A1 8/2011 Voss et al.
2011/0224580 A1 9/2011 Leathers et al.
2011/0314677 A1 12/2011 Meier et al.
2012/0059294 A1 3/2012 Schubert et al.
2012/0065556 A1 3/2012 Smith et al.
2012/0078071 A1 3/2012 Bohm et al.
2012/0124758 A1 5/2012 Sabisch et al.
2012/0161706 A1 6/2012 Zhou
2012/0197357 A1 8/2012 Dewey et al.
2012/0232445 A1 9/2012 Lev et al.
2012/0238922 A1 9/2012 Stemple et al.
2012/0253245 A1 10/2012 Stanbridge
2013/0014968 A1 1/2013 Kehoe et al.
2013/0030506 A1 1/2013 Bartolone et al.
2013/0046212 A1 2/2013 Nichols
2013/0052871 A1 2/2013 Eklind
2013/0085421 A1 4/2013 Gillespie et al.
2013/0116503 A1 5/2013 Mertens et al.
2013/0133210 A1 5/2013 Weir et al.
2013/0138023 A1 5/2013 Lerro
2013/0218058 A1 8/2013 Ceoldo et al.
2013/0237751 A1 9/2013 Alexander
2013/0241470 A1 9/2013 Kim
2013/0261516 A1 10/2013 Cilea et al.
2013/0261517 A1 10/2013 Rodgers
2013/0271067 A1 10/2013 Yu et al.
2013/0281897 A1 10/2013 Hoffmann et al.
2013/0304642 A1 11/2013 Campos
2014/0024982 A1 1/2014 Doyle
2014/0031866 A1 1/2014 Fuhr et al.
2014/0097793 A1 4/2014 Wurtz et al.
2014/0101872 A1 4/2014 Utsch et al.
2014/0163443 A1 6/2014 Young et al.
2014/0180331 A1 6/2014 Turner
2014/0190023 A1 7/2014 Vitantonio et al.
2014/0194900 A1 7/2014 Sedic
2014/0200495 A1 7/2014 Jones
2014/0207032 A1 7/2014 Dematio et al.
2014/0209594 A1 7/2014 Besner
2014/0221887 A1 8/2014 Wu
2014/0288473 A1 9/2014 Matsushita
2014/0305747 A1 10/2014 Kumar et al.
2014/0310900 A1 10/2014 Curry et al.
2014/0316313 A1 10/2014 Mayer et al.
2015/0005682 A1 1/2015 Danby et al.
2015/0042254 A1 2/2015 Kato
2015/0082562 A1 3/2015 Kamada
2015/0098184 A1 4/2015 Tsai et al.
2015/0119771 A1 4/2015 Roberts
2015/0133833 A1 5/2015 Bradley et al.
2015/0145297 A1 5/2015 Lee
2015/0148592 A1 5/2015 Kanbar et al.
2015/0157528 A1 6/2015 Le et al.
2015/0176674 A1 6/2015 Khan et al.
2015/0216719 A1 8/2015 DeBenedictis et al.
2015/0217142 A1 8/2015 Schafer
2015/0257964 A1 9/2015 Ajiki
2015/0305969 A1 10/2015 Giraud et al.
2015/0328081 A1 11/2015 Goldenberg et al.
2015/0375315 A1 12/2015 Ukai et al.
2016/0000642 A1 1/2016 Zipper
2016/0017905 A1 1/2016 Cascolan et al.
2016/0030279 A1 2/2016 Driscoll et al.
2016/0045661 A1 2/2016 Gray et al.
2016/0112841 A1 4/2016 Holland
2016/0113840 A1 4/2016 Crunick et al.

(56) References Cited

U.S. PATENT DOCUMENTS

| | | | |
|---|---|---|---|
| 2016/0113841 | A1 | 4/2016 | Godfrey et al. |
| 2016/0127129 | A1 | 5/2016 | Chee et al. |
| 2016/0129186 | A1 | 5/2016 | Douglas et al. |
| 2016/0136037 | A1 | 5/2016 | Cai |
| 2016/0136040 | A1 | 5/2016 | Li |
| 2016/0166464 | A1 | 6/2016 | Douglas et al. |
| 2016/0170996 | A1 | 6/2016 | Frank et al. |
| 2016/0192814 | A1 | 7/2016 | Kang et al. |
| 2016/0206502 | A1 | 7/2016 | Køltzow |
| 2016/0243359 | A1 | 8/2016 | Sharma |
| 2016/0263732 | A1 | 9/2016 | Lourenco et al. |
| 2016/0269486 | A1 | 9/2016 | Gupta et al. |
| 2016/0310353 | A1 | 10/2016 | Barasch |
| 2016/0311091 | A1 | 10/2016 | Wang |
| 2016/0324717 | A1 | 11/2016 | Burton |
| 2016/0338901 | A1 | 11/2016 | Cohen |
| 2016/0346163 | A1 | 12/2016 | Konik et al. |
| 2016/0367425 | A1 | 12/2016 | Wersland |
| 2017/0027798 | A1 | 2/2017 | Wersland |
| 2017/0042754 | A1 | 2/2017 | Fowers et al. |
| 2017/0049278 | A1 | 2/2017 | Thomassen |
| 2017/0069191 | A1 | 3/2017 | Erkkila |
| 2017/0119623 | A1 | 5/2017 | Attarian |
| 2017/0128320 | A1 | 5/2017 | Chen |
| 2017/0156974 | A1 | 6/2017 | Griner |
| 2017/0156975 | A1 | 6/2017 | Mills |
| 2017/0189227 | A1 | 7/2017 | Brunson et al. |
| 2017/0216136 | A1 | 8/2017 | Gordon |
| 2017/0233063 | A1 | 8/2017 | Zhao et al. |
| 2017/0246074 | A1 | 8/2017 | Wu |
| 2017/0304144 | A1 | 10/2017 | Tucker |
| 2017/0304145 | A1 | 10/2017 | Pepe |
| 2017/0312161 | A1 | 11/2017 | Johnson et al. |
| 2017/0360641 | A1 | 12/2017 | Nakata et al. |
| 2018/0008512 | A1 | 1/2018 | Goldstein |
| 2018/0050440 | A1 | 2/2018 | Chen |
| 2018/0078449 | A1 | 3/2018 | Callow |
| 2018/0133101 | A1 | 5/2018 | Inada |
| 2018/0140100 | A1 | 5/2018 | Cribbs |
| 2018/0140502 | A1 | 5/2018 | Shahoian et al. |
| 2018/0141188 | A1 | 5/2018 | Lai |
| 2018/0154141 | A1 | 6/2018 | Ahn |
| 2018/0185234 | A1 | 7/2018 | Ishiguro et al. |
| 2018/0200141 | A1 | 7/2018 | Wersland et al. |
| 2018/0236572 | A1 | 8/2018 | Ukai |
| 2018/0243158 | A1 | 8/2018 | Loghmani et al. |
| 2018/0263845 | A1 | 9/2018 | Wersland et al. |
| 2018/0279843 | A1 | 10/2018 | Paul et al. |
| 2018/0288160 | A1 | 10/2018 | Paul et al. |
| 2018/0296433 | A1 | 10/2018 | Danby et al. |
| 2018/0315499 | A1 | 11/2018 | Appelbaum et al. |
| 2018/0315504 | A1 | 11/2018 | Inada et al. |
| 2019/0000709 | A1 | 1/2019 | Sone et al. |
| 2019/0038229 | A1 | 2/2019 | Perraut et al. |
| 2019/0066833 | A1 | 2/2019 | Wicki |
| 2019/0110945 | A1 | 4/2019 | Kawagoe et al. |
| 2019/0175434 | A1 | 6/2019 | Zhang |
| 2019/0209424 | A1 | 7/2019 | Wersland et al. |
| 2019/0216677 | A1 | 7/2019 | Paul |
| 2019/0232478 | A1 | 8/2019 | Zawisza et al. |
| 2019/0254921 | A1 | 8/2019 | Marton et al. |
| 2019/0254922 | A1 | 8/2019 | Marton et al. |
| 2019/0314239 | A1 | 10/2019 | Ci |
| 2019/0337140 | A1 | 11/2019 | Shanklin |
| 2019/0350793 | A1 | 11/2019 | Wersland et al. |
| 2019/0381271 | A1 | 12/2019 | Jo |
| 2020/0000237 | A1 | 1/2020 | Wu |
| 2020/0009010 | A1 | 1/2020 | Park et al. |
| 2020/0016027 | A1 | 1/2020 | Kim et al. |
| 2020/0035237 | A1 | 1/2020 | Kim et al. |
| 2020/0069510 | A1 | 3/2020 | Wersland et al. |
| 2020/0085675 | A1 | 3/2020 | Lee et al. |
| 2020/0090175 | A1 | 3/2020 | Davis et al. |
| 2020/0179210 | A1 | 6/2020 | Barragan Gomez |
| 2020/0179215 | A1 | 6/2020 | Lerner |
| 2020/0230012 | A1 | 7/2020 | Fuhr |
| 2020/0241683 | A1 | 7/2020 | Le et al. |
| 2020/0261306 | A1 | 8/2020 | Pepe |
| 2020/0261307 | A1 | 8/2020 | Wersland et al. |
| 2020/0268594 | A1 | 8/2020 | Pepe |
| 2020/0294423 | A1 | 9/2020 | Blain et al. |
| 2020/0352821 | A1* | 11/2020 | Wersland ........... A61H 23/0263 |
| 2020/0390644 | A1 | 12/2020 | Yang |
| 2020/0397651 | A1 | 12/2020 | Park et al. |
| 2020/0405570 | A1 | 12/2020 | Kodama |
| 2021/0000683 | A1 | 1/2021 | Cheng |
| 2021/0022955 | A1 | 1/2021 | Wersland et al. |
| 2021/0059898 | A1 | 3/2021 | Wersland et al. |
| 2021/0085555 | A1 | 3/2021 | Davis et al. |
| 2021/0128402 | A1 | 5/2021 | Dai et al. |
| 2021/0330539 | A1 | 10/2021 | Faussett |
| 2022/0000781 | A9 | 1/2022 | Leneweit et al. |
| 2022/0007810 | A1 | 1/2022 | Paspatis et al. |
| 2022/0054350 | A1 | 2/2022 | Merino et al. |
| 2022/0087433 | A1 | 3/2022 | Mao et al. |
| 2022/0241135 | A1 | 8/2022 | Wang |
| 2023/0001131 | A1 | 1/2023 | English et al. |

FOREIGN PATENT DOCUMENTS

| | | | |
|---|---|---|---|
| CN | 86101310 | A | 9/1986 |
| CN | 1432452 | A | 7/2003 |
| CN | 2788807 | Y | 6/2006 |
| CN | 201239336 | Y | 5/2009 |
| CN | 201239338 | Y | 5/2009 |
| CN | 201333160 | Y | 10/2009 |
| CN | 201524220 | U | 7/2010 |
| CN | 101888050 | A | 11/2010 |
| CN | 201743890 | U | 2/2011 |
| CN | 201847899 | U | 6/2011 |
| CN | 301664182 | S | 9/2011 |
| CN | 202161539 | U | 3/2012 |
| CN | 202637439 | U | 1/2013 |
| CN | 103648320 | A | 3/2014 |
| CN | 203598194 | U | 5/2014 |
| CN | 104352341 | A | 2/2015 |
| CN | 303250924 | S | 6/2015 |
| CN | 303250929 | S | 6/2015 |
| CN | 205163583 | U | 4/2016 |
| CN | 104352341 | B | 7/2016 |
| CN | 205459750 | U | 8/2016 |
| CN | 205494357 | U | 8/2016 |
| CN | 205598186 | U | 9/2016 |
| CN | 106074129 | A | 11/2016 |
| CN | 106236528 | A | 12/2016 |
| CN | 206081000 | U | 4/2017 |
| CN | 106859949 | A | 6/2017 |
| CN | 107374898 | A | 11/2017 |
| CN | 304561844 | S | 3/2018 |
| CN | 207286298 | U | 5/2018 |
| CN | 207855923 | U | 9/2018 |
| CN | 109259995 | A | 1/2019 |
| CN | 208405314 | U | 1/2019 |
| CN | 208448086 | U | 2/2019 |
| CN | 109528473 | A | 3/2019 |
| CN | 209154392 | U | 7/2019 |
| CN | 110868983 | A | 3/2020 |
| CN | 106618998 | B | 8/2020 |
| CN | 111616938 | A | 9/2020 |
| CN | 111973419 | A | 11/2020 |
| CN | 113143721 | A | 7/2021 |
| CN | 113509366 | A | 10/2021 |
| CN | 113509369 | A | 10/2021 |
| DE | 3633888 | A1 | 4/1988 |
| DE | 19905199 | A1 | 7/2000 |
| DE | 102015102112 | A1 | 8/2015 |
| DE | 202015005257 | U1 | 10/2016 |
| EP | 0436719 | B1 | 5/1994 |
| EP | 1728494 | A1 | 12/2006 |
| EP | 2080500 | A1 | 7/2009 |
| EP | 2328255 | A1 | 6/2011 |
| EP | 1728494 | B1 | 1/2013 |
| EP | 3388003 | A1 | 10/2018 |
| GB | 2066081 | A | 7/1981 |

(56) References Cited

FOREIGN PATENT DOCUMENTS

| | | | |
|---|---|---|---|
| GB | 2262236 | A | 6/1993 |
| JP | S5230553 | A | 3/1977 |
| JP | S5428491 | A | 3/1979 |
| JP | H0219157 | A | 1/1990 |
| JP | H03218763 | A | 9/1991 |
| JP | H048128 | B2 | 2/1992 |
| JP | H0447440 | A | 2/1992 |
| JP | H0447440 | U | 4/1992 |
| JP | H0751393 | A | 2/1995 |
| JP | 2000189525 | A | 7/2000 |
| JP | 3077837 | U | 6/2001 |
| JP | 2002282322 | A | 10/2002 |
| JP | 2003077837 | A | 3/2003 |
| JP | 2005204777 | A | 8/2005 |
| JP | 2006034941 | A | 2/2006 |
| JP | 2006212228 | A | 8/2006 |
| JP | 2008510588 | A | 4/2008 |
| JP | 2008289616 | A | 12/2008 |
| JP | 2010534110 | A | 11/2010 |
| JP | 2011502369 | A | 1/2011 |
| JP | 5129032 | B2 | 1/2013 |
| JP | 2013119018 | A | 6/2013 |
| JP | 2014511240 | A | 5/2014 |
| JP | 2015035844 | A | 2/2015 |
| JP | 2015104422 | A | 6/2015 |
| JP | 2018518347 | A | 7/2018 |
| JP | 2021510606 | A | 4/2021 |
| KR | 200313149 | Y1 | 5/2003 |
| KR | 200435552 | Y1 | 1/2007 |
| KR | 100752432 | B1 | 8/2007 |
| KR | 20090119424 | A | 11/2009 |
| KR | 20120004574 | A | 1/2012 |
| KR | 101123926 | B1 | 4/2012 |
| KR | 101162978 | B1 | 7/2012 |
| KR | 101406275 | B1 | 6/2014 |
| KR | 20170106550 | A | 9/2017 |
| KR | 20170108550 | A | 9/2017 |
| KR | 20180031683 | A | 3/2018 |
| KR | 20200051098 | A | 5/2020 |
| RU | 2170567 | C1 | 7/2001 |
| TW | M343481 | U | 11/2008 |
| TW | I359657 | B | 3/2012 |
| TW | 201440753 | A | 11/2014 |
| WO | WO-0100269 | A1 | 1/2001 |
| WO | WO-0119316 | A2 | 3/2001 |
| WO | WO-2009014727 | A1 | 1/2009 |
| WO | WO-2009102279 | A1 | 8/2009 |
| WO | WO-2011159317 | A1 | 12/2011 |
| WO | WO-2013114084 | A1 | 8/2013 |
| WO | WO-2013145346 | A1 | 10/2013 |
| WO | WO-2014118596 | A1 | 8/2014 |
| WO | WO-2015038005 | A2 | 3/2015 |
| WO | WO-2018012105 | A1 | 1/2018 |
| WO | WO-2019186225 | A1 | 10/2019 |
| WO | WO-2020139715 | A1 | 7/2020 |
| WO | WO-2021050861 | A1 | 3/2021 |
| WO | WO-2021168450 | A1 | 8/2021 |
| WO | WO-2023172676 | A2 | 9/2023 |

OTHER PUBLICATIONS

Amazon: "PowerA Joy Con & Pro Controller Charging Dock Nintendo Switch," PowerA, Oct. 31, 2017, Especially annotated figures, Retrieved from Entire Document, 10 Pages.

Amazon: "Theragun G3PRO Percussive Therapy Device, White, Handheld Deep Muscle, Treatment Massager & Muscle Stimulator for Pain Relief, Recovery, Enhance Performance & Energize The Body," Feb. 13, 2019, Shown on pp. 1, 2 Pages, Retrieved from URL: https://www.amazon.com/dp/B07MJ2MCT3/ref=nav_timeline_asin?_encoding=UTF8&psc=1.

Anthony Katz, "The RAPTOR: Helps Patients and Saves Your Most Valuable Tool . . . Your Hands," DC Aligned:MeyerDC, Dec. 9, 2015, available at: http://news.meyerdc.com/community/vendor-spotlight/the-raptor-helps-patients-saves-your-most-valuable-tool-your-hands/ (last visited Feb. 15, 2023); 5 pages.

Bardwell D., "Wahl's Massage Products—Meant for Life's Big Pains," DougBardwell.com, Apr. 6, 2016, 7 Pages, [Retrieved On Jun. 3, 2021] Retrieved from URL: https://dougbardwell.com/db/2016/04/06/wahls-massage-products-meant-for-lifes-big-pains/.

Collins D., "External Rotor Motor Basics: Design and Applications," Jun. 6, 2018, 03 Pages.

Collins D., "FAQ: What are Hall Effect Sensors and What Is Theirs Role In DC Motors?," Jan. 11, 2017, 03 Pages.

Defendant's Initial Invalidity Contentions, *Therabody, Inc.* v. *Tzumi Electronics LLC et al.*, Case No. SDNY-1-21-cv-07803 (PGG)(RWL), dated Aug. 17, 2022; 16 pages.

Description of Therabody GI Device, available at: https://www.therabody.com/us/en-us/faq/thearagun-devices/faq-devices-1.html?fdid=faq&csortb1=sortOrder&csortd1=1 (last visited Feb. 15, 2023).

Digi-Key's North American Editors: "How to Power and Control Brushless DC Motors," Dec. 7, 2016, 09 Pages.

Examination Report For Australian Patent Application No. 2016284030, dated May 7, 2018, 3 Pages.

Extended European Search Report for European Application No. 16815104.1, mailed Jan. 23, 2019, 08 Pages.

Extended European Search Report for European Application No. 18832213.5, mailed Jul. 21, 2021, 11 Pages.

Extended European Search Report for European Application No. 18832923.9, mailed Apr. 23, 2021, 7 Pages.

Extended European Search Report for European Application No. 20720323.3, mailed Sep. 9, 2021, 10 Pages.

Extended European Search Report for European Application No. 20802710.2, mailed May 10, 2022, 9 Pages.

Extended European Search Report for European Application No. 20802804.3, mailed Apr. 28, 2022, 8 Pages.

Extended European Search Report for European Application No. 21178300.6, mailed Oct. 19, 2021, 9 Pages.

Extended European Search Report for European Application No. 21178311.3, mailed Sep. 23, 2021, 5 Pages.

Holly Riddle, "Theragun vs. Hyperice vs, Hydragun: Massage Gun Showdown [Buyer's Guide]," ChatterSource: Health & Wellness, Mar. 9, 2021, available at: https://www.chattersource.com/article/massage-gun/ (last visited Feb. 17, 2023); 14 pages.

International Preliminary Report on Patentability for International Application No. PCT/US2016/038326, mailed Jan. 4, 2018, 8 Pages.

International Preliminary Report on Patentability for International Application No. PCT/US2018/022426, mailed Sep. 26, 2019, 9 Pages.

International Preliminary Report on Patentability for International Application No. PCT/US2018/039599, mailed Jan. 23, 2020, 8 Pages.

International Preliminary Report on Patentability for International Application No. PCT/US2018/040795, mailed Jan. 23, 2020, 7 Pages.

International Preliminary Report on Patentability for International Application No. PCT/US2019/067624, mailed Jul. 8, 2021, 11 Pages.

International Preliminary Report on Patentability for International Application No. PCT/US2020/017645, mailed Aug. 26, 2021, 11 Pages.

International Preliminary Report on Patentability for International Application No. PCT/US2020/031339, mailed Nov. 18, 2021,11 Pages.

International Preliminary Report on Patentability for International Application No. PCT/US2020/031936, mailed Nov. 18, 2021, 14 Pages.

International Preliminary Report on Patentability for International Application No. PCT/US2020/050385, mailed Mar. 24, 2022, 12 Pages.

International Preliminary Report on Patentability for International Application No. PCT/US2020/050399, mailed Jan. 13, 2022, 6 Pages.

International Preliminary Report on Patentability for International Application No. PCT/US2020/054773, mailed Apr. 21, 2022, 8 Pages.

(56) References Cited

OTHER PUBLICATIONS

International Preliminary Report on Patentability for International Application No. PCT/US2020/054842, mailed Apr. 21, 2022, 7 Pages.
International Preliminary Report on Patentability for International Application No. PCT/US2020/063426, mailed Jun. 16, 2022, 06 Pages.
International Preliminary Report on Patentability for International Application No. PCT/US2021/022500, mailed Oct. 6, 2022, 6 Pages.
International Preliminary Report on Patentability for International Application No. PCT/US2021/029900, mailed Nov. 10, 2022, 9 Pages.
International Preliminary Report on Patentability for International Application No. PCT/US2021/029903, mailed Nov. 10, 2022, 7 Pages.
International Search Report and Written Opinion for International Application No. PCT/US2016/038326, mailed Sep. 1, 2016, 9 Pages.
International Search Report and Written Opinion for International Application No. PCT/US2018/022426, mailed May 31, 2018, 10 Pages.
International Search Report and Written Opinion for International Application No. PCT/US2018/039599, mailed Sep. 24, 2018, 9 Pages.
International Search Report and Written Opinion for International Application No. PCT/US2018/040795, mailed Sep. 24, 2018, 8 Pages.
International Search Report and Written Opinion for International Application No. PCT/US2019/067624, mailed Feb. 3, 2020, 13 Pages.
International Search Report and Written Opinion for International Application No. PCT/US2020/017645, mailed May 20, 2020, 13 Pages.
International Search Report and Written Opinion for International Application No. PCT/US2020/031339, mailed Jun. 10, 2020, 12 Pages.
International Search Report and Written Opinion for International Application No. PCT/US2020/031347, mailed Aug. 3, 2020, 9 Pages.
International Search Report and Written Opinion for International Application No. PCT/US2020/031936, mailed Sep. 11, 2020, 17 Pages.
International Search Report and Written Opinion for International Application No. PCT/US2020/050385, mailed Dec. 3, 2020, 13 Pages.
International Search Report and Written Opinion for International Application No. PCT/US2020/050399, mailed Feb. 4, 2021, 11 Pages.
International Search Report and Written Opinion for International Application No. PCT/US2020/054773, mailed Jan. 12, 2021, 9 Pages.
International Search Report and Written Opinion for International Application No. PCT/US2020/054842, mailed Jan. 11, 2021, 8 Pages.
International Search Report and Written Opinion for International Application No. PCT/US2020/063426, mailed Feb. 26, 2021, 09 Pages.
International Search Report and Written Opinion for International Application No. PCT/US2021/022500, mailed Apr. 20, 2021, 7 Pages.
International Search Report and Written Opinion for International Application No. PCT/US2021/029900, mailed Oct. 6, 2021, 12 Pages.
International Search Report and Written Opinion for International Application No. PCT/US2021/029903, mailed Jul. 28, 2021, 8 Pages.
International Search Report and Written Opinion for International Application No. PCT/US2022/028309, mailed Sep. 8, 2022, 10 Pages.
International Search Report and Written Opinion for International Application No. PCT/US2022/076238, mailed Jan. 23, 2023, 12 Pages.
Japanese Office Action mailed Jan. 10, 2023, in Japanese Patent Application No. 2022165143, filed Oct. 14, 2022, 6 pages.
Japanese Office Action mailed Jun. 14, 2022, in Japanese Patent Application No. 2020555400, filed Dec. 19, 2019, 7 pages.
Machine translation from Espacenet of written description and claims for CN106074129A, 9 pages (2016).
Machine translation from Espacenet of written description and claims for CN111616938A, 5 pages (2020).
Machine translation from Espacenet of written description and claims for CN111973419A, 7 pages (2020).
Machine Translation of Written Description and Claims for WO2013145346A1 (Year: 2013).
Massage Expert: "Nursal Deep Percussion Massager Review—6 Interchangeable Nodes," Jan. 4, 2021, 6 Pages, [Retrieved on Jun. 3, 2021] Retrieved from URL: https://www.massagexpert.net/nursal-deep-percussion-massager-review/.
McFarland M., "Segway Was Supposed to Change the World, Two Decades Later, It Just Might," CNN Wire Service, Oct. 30, 2018, 7 Pages.
Notice of Reasons for Rejection for Japanese Patent Application No. 2018-517683, dated Oct. 2, 2018, 10 Pages.
Office Action For Canadian Application No. 2,990, 178, dated Oct. 15, 2018, 4 Pages.
Partial Supplementary European Search Report for European Application No. 18832213.5, mailed Apr. 20, 2021, 12 Pages.
Rachel [no family name indicated], "Jigsaw Massager," Instructables, Apr. 18, 2010, 6 Pages, Retrieved from URL: https://web.archive.org/web/20100418041422/http://www.instructables.com/id/Jigsaw-Massager/.
Rockwell: "Trans4mer Operating Manual for Multi-purpose saw," Model RK2516/RK2516K, 2011, 32 Pages.
Supplementary European Search Report for European Application No. 19904459.5, mailed Apr. 15, 2021, 04 Pages.
Testberichte.de: "Naipo Handheld Percussion Massager with Heating (MGPC 5000)," amazon.de, 7 Pages, [Retrieved on Jun. 3, 2021] Retrieved from URL: https://www.testberichte.de/p/naipo-tests/handheld-percussion-massager-with-heating-mgpc-5000-testbericht.html, See also a YouTube Review of this Device dated May 21, 2018 at https://www.youtube.com/watch?v=bi_QCJA3D9k.
Visual Description of Hyper Ice, Inc. Raptor Device, "Osteopatia Haidy Ortale—Raptor Massage," available at: https://www.youtube.com/watch?v=plyW8FBowVs (last visited Feb. 15, 2023); 1 page.
Visual Description of Hyper Ice, Inc. Raptor Device, "Raptor Solutions 1.3 Prone," available at: https://www.youtube.com/watch?v=6i1tRqdwPU8&t=156s (last visited Feb. 15, 2023); 1 page.
WORX Trans4mer "Safety and Operating Manual Original Instructions" for 12V Li-Ion Multipurpose saw, WX540, NX540.3, WX540.9, 16 pages (2013).
Written Opinion for International Application No. PCT/US2023/063004 mailed Jul. 28, 2023, 14 pages.
YouTube: "Unboxing: Joy-Con & Pro Controller Charging Dock for Nintendo Switch," Crusherbad64, Especially demonstration 8:30-8:55, (This reference is Being Used to Show Greater Details of Product not Clearly Disclosed in 'PowerA'), Feb. 26, 2018, Retrieved from entire document, 1 Page.

* cited by examiner

PORTABLE PERCUSSIVE MASSAGE DEVICE

CROSS REFERENCE TO RELATED APPLICATIONS

This application is a continuation U.S. patent application Ser. No. 17/833,412, filed Jun. 6, 2022, which is a continuation-in-part of U.S. patent application Ser. No. 17/515,008, filed Oct. 29, 2021, which is a continuation of U.S. patent application Ser. No. 17/190,955, filed Mar. 3, 2021, now U.S. Pat. No. 11,160,723. U.S. patent application Ser. No. 17/515,008 is also a continuation of U.S. patent application Ser. No. 16/824,328, filed Mar. 19, 2020, now U.S. Pat. No. 10,945,915, which is a continuation-in-part of U.S. patent application Ser. No. 29/708,815, filed Oct. 9, 2019, now U.S. Pat. No. D951,470. U.S. patent application Ser. No. 16/824,328 also claims priority to U.S. Provisional Patent Application No. 62/899,098, filed Sep. 11, 2019, and U.S. Provisional Patent Application No. 62/844,424, filed May 7, 2019. All of the applications listed above are hereby incorporated by reference in their entireties herein.

FIELD OF THE INVENTION

The present disclosure relates generally to a percussive massage device, and more particularly to a portable percussive massage device.

BACKGROUND

Percussive massage devices have become increasingly popular in recent years. However, they often can be bulky and difficult to transport in a gym bag or the like. While smaller percussive massage devices are generally considered more portable and easier to transport, the reduced volume inside such smaller devices can often lead to inadequate ventilation between the various component parts arranged therein. As a result, some component parts, such as the motor and associated circuitry, are prone to overheat during use, which can lead to failure of the percussive massage device. Accordingly, there is a need to provide a compact percussive massage device having suitable ventilation to prevent overheating of the internal components.

SUMMARY

In one embodiment of the present disclosure, a percussive massage device may include a housing defining a housing interior. The device may also include a motor positioned in the housing interior, the motor including a rotatable motor shaft defining a motor axis. The device may further include a battery positioned in the housing interior. The device may also include a switch configured to activate the motor. The device may further include a reciprocating shaft operatively connected to the rotatable motor shaft, the reciprocating shaft including a distal end defining a reciprocation axis, and the reciprocating shaft configured to reciprocate in response to rotation of the motor shaft. The device may also include a vent extending through a vent opening in the housing, the vent configured to provide ventilation to the housing interior.

Some embodiments of the present disclosure may include one or more of the following features. The percussive massage device housing may include a first side portion and a second side portion, the motor may be positioned in the first side portion, and the battery may be positioned in the second side portion. A motor axis may be disposed between the switch and the vent, and the motor axis may be generally perpendicular to the reciprocation axis. The vent further may include a plurality of vent holes configured to allow airflow into and out of the housing interior. The vent holes may be circular-shaped, oval-shaped, rectangular-shaped, square-shaped, or another non-polygonal shaped. The vent may further include one or more flanges configured to engage the housing to securely fix the vent within the vent opening. The vent may have a convex shape. The percussive massage device may include a wireless communications device configured to communicate with a wireless control device. At least one of the motor or the reciprocating shaft further may include a force meter. The percussive massage device may include a counterweight operable to rotate about the motor axis upon rotation of the motor shaft. The visual indicator may be adjacent to the switch. The switch may be a button. The percussive massage device may include a stabilizer disposed between the vent and the motor, the stabilizer being co-axially aligned with the motor axis. The battery may define a battery axis, the battery axis being generally parallel to the reciprocation axis, where the motor axis is generally perpendicular to the reciprocation axis and the battery axis. The motor may be positioned on the first side of the middle member and the reciprocating shaft may be positioned on the second side of the middle member. The middle member may include a shaft opening defined therein, where the rotatable motor shaft extends from the first side of the middle member through the shaft opening and to the second side of the middle member. The bush assembly may include a bush, a bush holding structure, and a dampening bush cover positioned between the bush and the bush holding structure. An outer surface of the housing may include finger recesses configured to be grasped by a user.

In some embodiments, a method of massaging a body part may include grasping the percussive massage device with a hand of a user such that the reciprocation axis of the reciprocation shaft extends through a palm of the first hand, and massaging the body part with a massage attachment connected to the distal end of the reciprocating shaft. Grasping the percussive massage device may include placing a finger of the hand in a first finger recess of one side of the housing and a thumb of the hand of the user in a second finger recess of another side of the housing.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

In order that the present disclosure may be readily understood, aspects of the portable percussive massage device are illustrated by way of examples in the accompanying drawings, in which like parts are referred to with like reference numerals throughout.

DETAILED DESCRIPTION

Figure 1:
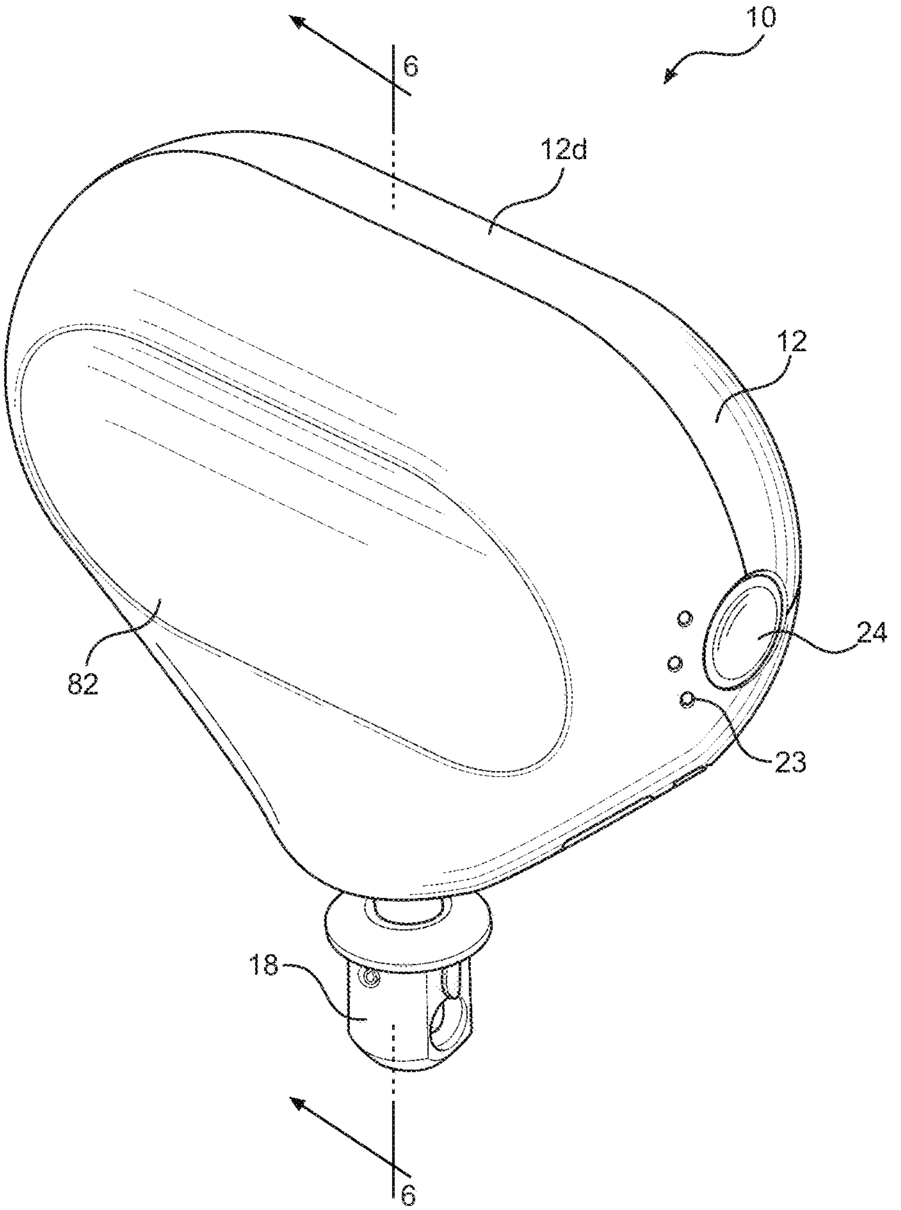
FIG. 1 is a perspective view of a portable percussive massage device in accordance with an embodiment of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present disclosure.

Referring now to the drawings, which are for purposes of illustrating the present disclosure and not for purposes of limiting the same, FIGS. 1-8 show embodiments of portable percussive massage devices 10 in accordance with embodiments of the present disclosure.

Figure 2:
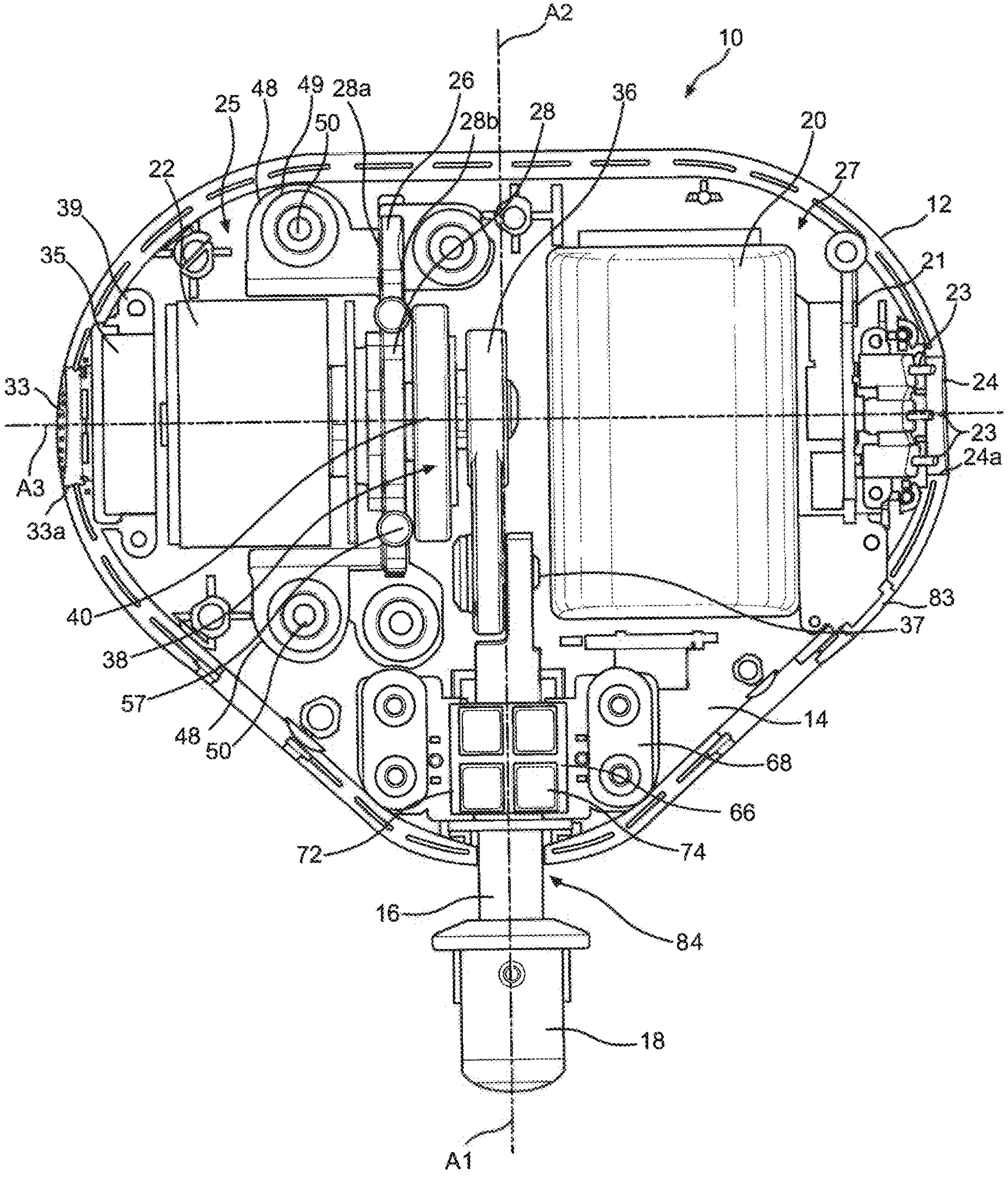
FIG. 2 is a front elevational view of the percussive massage device with one housing half removed.

As shown in FIGS. 1-2, in one embodiment, a percussive massage device 10 generally includes a housing 12 that forms a housing interior 14, a reciprocating shaft 16, and an attachment member 18 (secured on the distal end 16*a* of the reciprocating shaft 16) for securing a massage member or attachment thereto. In one embodiment, the device may include one of the attachment members 18 disclosed in U.S. Pat. No. 10,557,490 (the '490 patent), the entirety of which is incorporated herein by reference. The reciprocating shaft 16 may be configured to receive a plurality of different attachment members 18. The attachment member 18 may be used to attach a treatment member or massage attachment 19 (see FIG. 8). The male attachment member 18 shown in the drawings may be similar to the embodiment shown in FIGS. 11-13 in the '490 patent. However, the embodiments shown in any of FIGS. 1-10 in the '490 patent or other systems for connecting a massage attachment to a percussive massage device may be used in certain embodiments. For example, in another embodiment, the reciprocating shaft 16 may include a female attachment member that mates with a male attachment member on the massage attachment 19.

As shown in FIG. 2, the percussive massage device 10 may further include a battery or batteries 20 (or other power source, such as an AC plug), a motor 22 positioned in the housing 12, and a switch 24 for activating the motor. In one embodiment, the motor 22 may be a brushless direct current (BLDC) motor. The motor 22 may be configured to vary the speed (i.e., rate of rotational motion) that may be converted to reciprocal motion, as described below. In other embodiments, the motor may be, for example, a brushed DC motor, a brushed AC motor, or a brushless AC motor. It has been determined that for some embodiments of the present disclosure, the choice between a brushless or brushed motor, or direct current or alternating current, may depend on the application and intended size, battery power, and use case. The battery 20 may be positioned in a battery recess 20*a*, 20*b* formed in the housing 12 and may be electrically connected or communicated with a printed circuit board (PCB) 21 and an associated controller, which may control the operation of the percussive massage device 10. In one embodiment, a switch 24 may be a push button whose operation is controlled to turn the device on and off, change speeds, change modes, etc. In one embodiment, the push button may comprise the PANTONE 299-C color. In some implementations, the PCB 21 may be configured for wireless communication, such as via Bluetooth® wireless technology, with a corresponding wireless control device (not shown). Such a wireless control device may include a mobile device executing an application, a remote controller, or the like. According to some aspects, operation of the percussive massage device 10 may be controlled via the wireless control device. For instance, the wireless control device may be used to customize a speed of the motor, change modes, or turn the motor on/off, among other operations.

In some implementations, the percussive massage device 10 may also include a force meter or other type of measuring instrument configured to determine a massage parameter. The force meter may be included as part of the motor 22, reciprocating shaft 16, and/or push rod 36. Such a force meter, for example, may be operable to measure an amount of percussive force applied to a user. The percussive massage device 10 or wireless control device may then change a massage parameter, such as power applied by the motor 22, distance of travel of the reciprocating shaft 16, or speed, based on the measured percussive force. For example, if the measured percussive force is above a predetermined threshold, the percussive massage device 10 or wireless control device can lower the power applied by the motor 22 via closed loop feedback.

Figure 7:
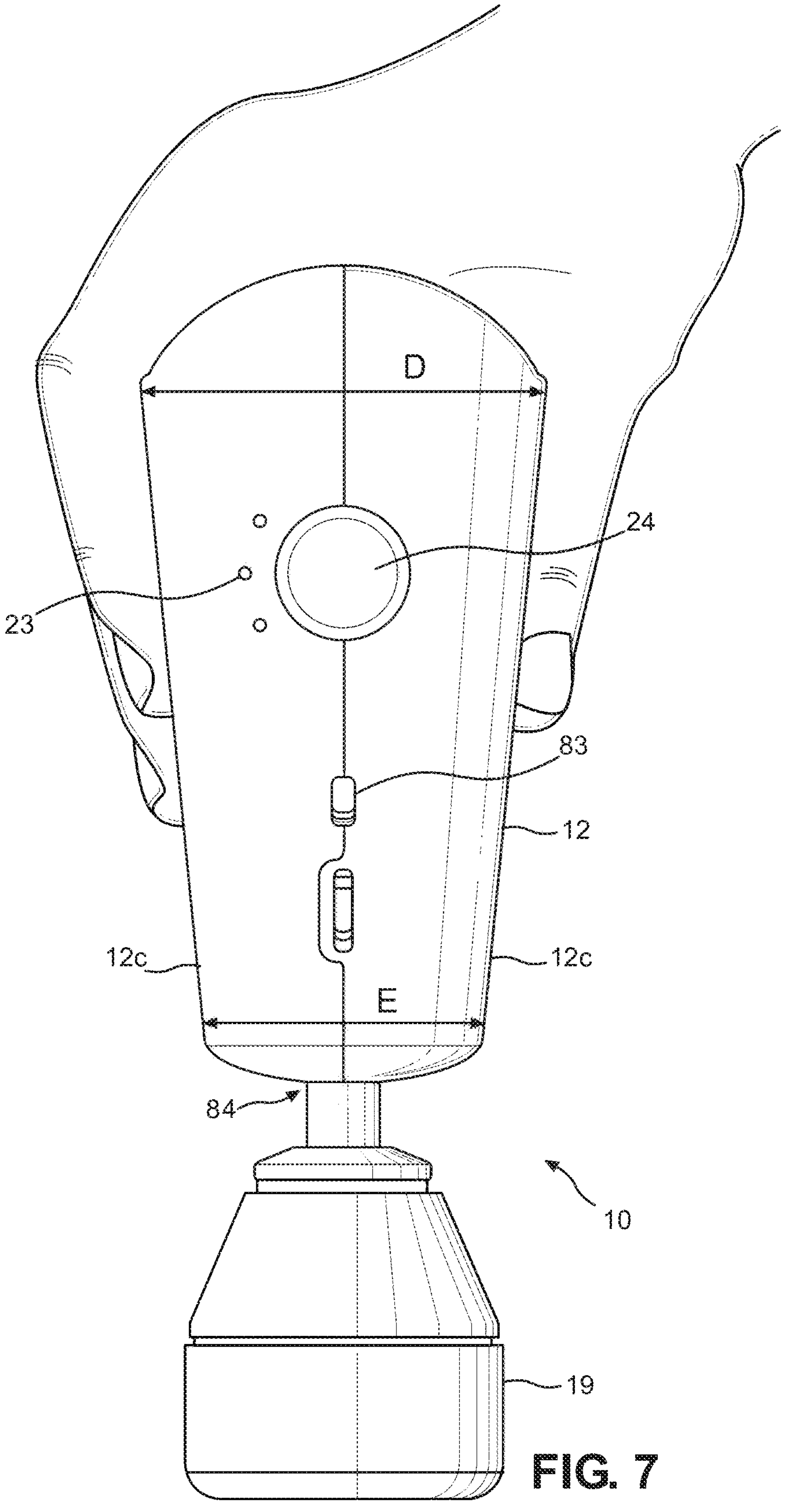
FIG. 7 is a side elevational view of the percussive massage device being grasped by a user.

In one embodiment, the housing 12 may also include one or more visual indicators 23 operable to indicate a status of the percussive massage device as shown, for example, in FIGS. 1, 2, and 7. The visual indicators 23 may be adjacent to the switch 24. In one implementation, the visual indicators may include lights that show a status, such as on/off, or which speed or mode the device is set to. A long push of the switch 24 may turn the device on or off, and short pushes of the switch 24 may change speeds or modes. The switch may extend through an opening 24*a* in the housing 12. The PCB 21 and associated controller may communicate with the motor 22. A charging port 83 may also be provided in the housing for connecting a charging cable to charge the battery 20.

In some embodiments, as shown in FIGS. 2-5, the percussive massage device 10 may include a motor mount bracket 26 positioned in the housing interior 14. The motor mount bracket 26 may include a middle member 28 having first and second opposite sides 28*a* and 28*b*. The motor 22 may be positioned on the first side 28*a* and the reciprocating shaft 16 may be positioned on the second side 28*b* of the middle member 28. The middle member 28 may include a shaft opening 30 extending therethrough. The motor 22 may include a rotatable motor shaft 32 extending therefrom that extends from the first side 28*a* of the middle member 28, through the shaft opening 30 and to the second side 28*b* of the middle member 28. In some embodiments, the motor 22 may be secured to the motor mount bracket 26 via threaded fasteners. However, other attachments, such as welding, gluing, rivets, bolts and the like may also be included in some embodiments.

In one embodiment, the motor mount bracket 26 may include flanges 44 extending from the middle member 28. The flanges 44 may partially form a motor space 46 where at least a portion of the motor 22 may be housed. The middle member 28 may also include a plurality of feet 48 extending therefrom that may include tubular members 49 and securing openings 50 extending therethrough. Dampening rings 51 and dampening washers 52 may also be included. All dampening components herein may be made of rubber, silicone or the like and may be included to prevent plastic to plastic or plastic to metal contact, and/or to reduce noise and vibration.

Figure 3:
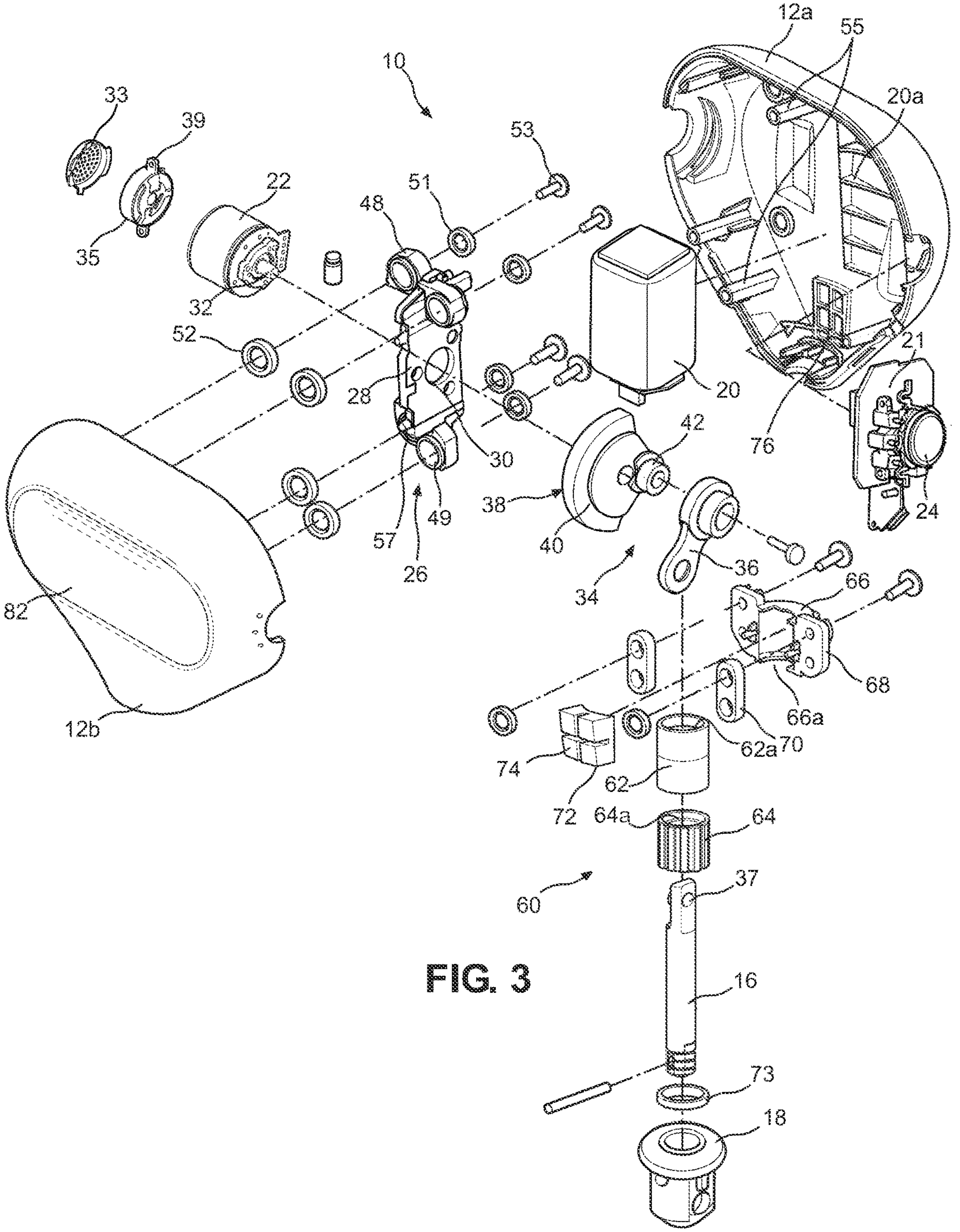
FIG. 3 is an exploded perspective view of the percussive massage device of FIG. 1.
Figure 4:
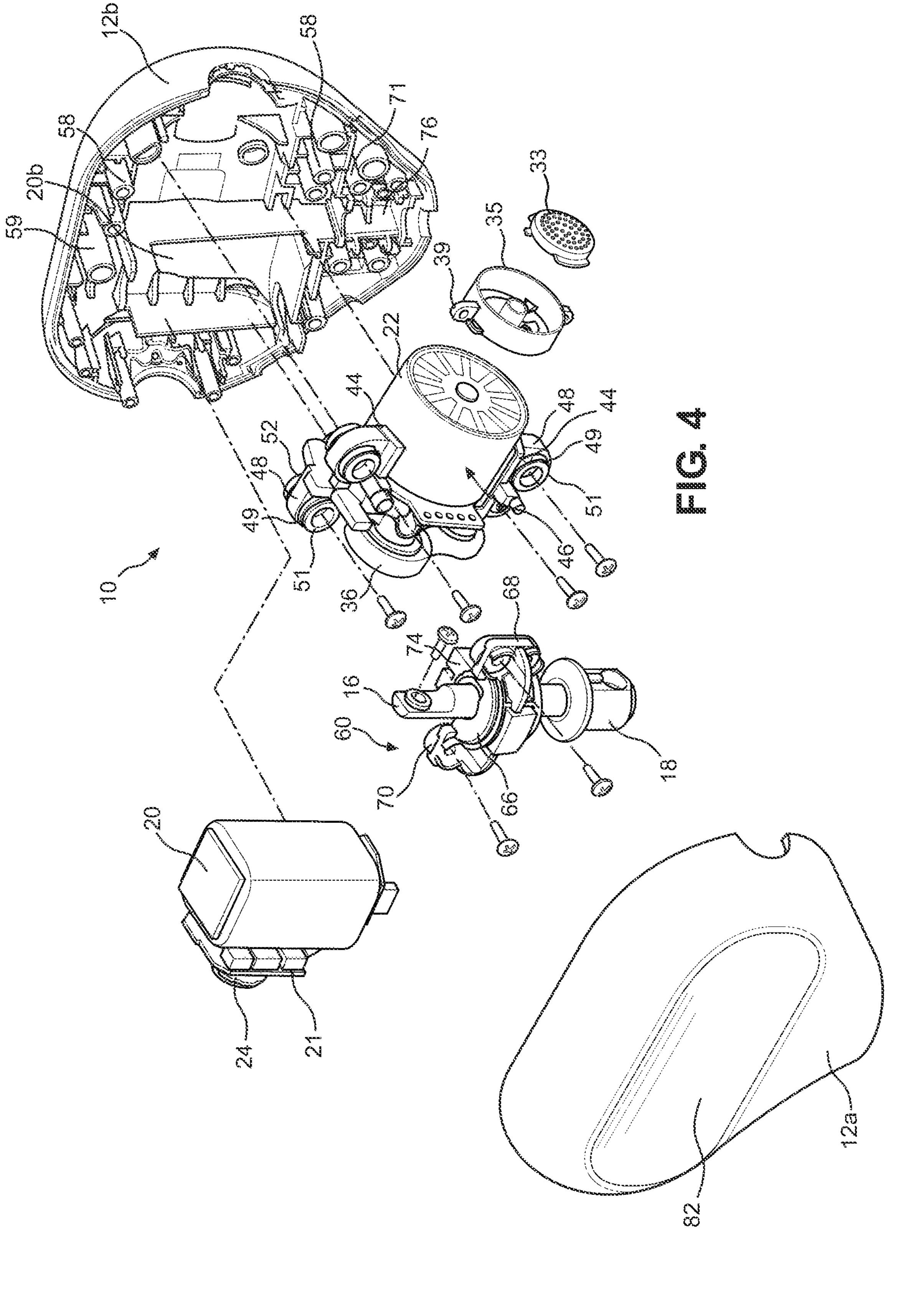
FIG. 4 is an exploded perspective view of the percussive massage device from the opposite side of FIG. 3.
Figure 5:
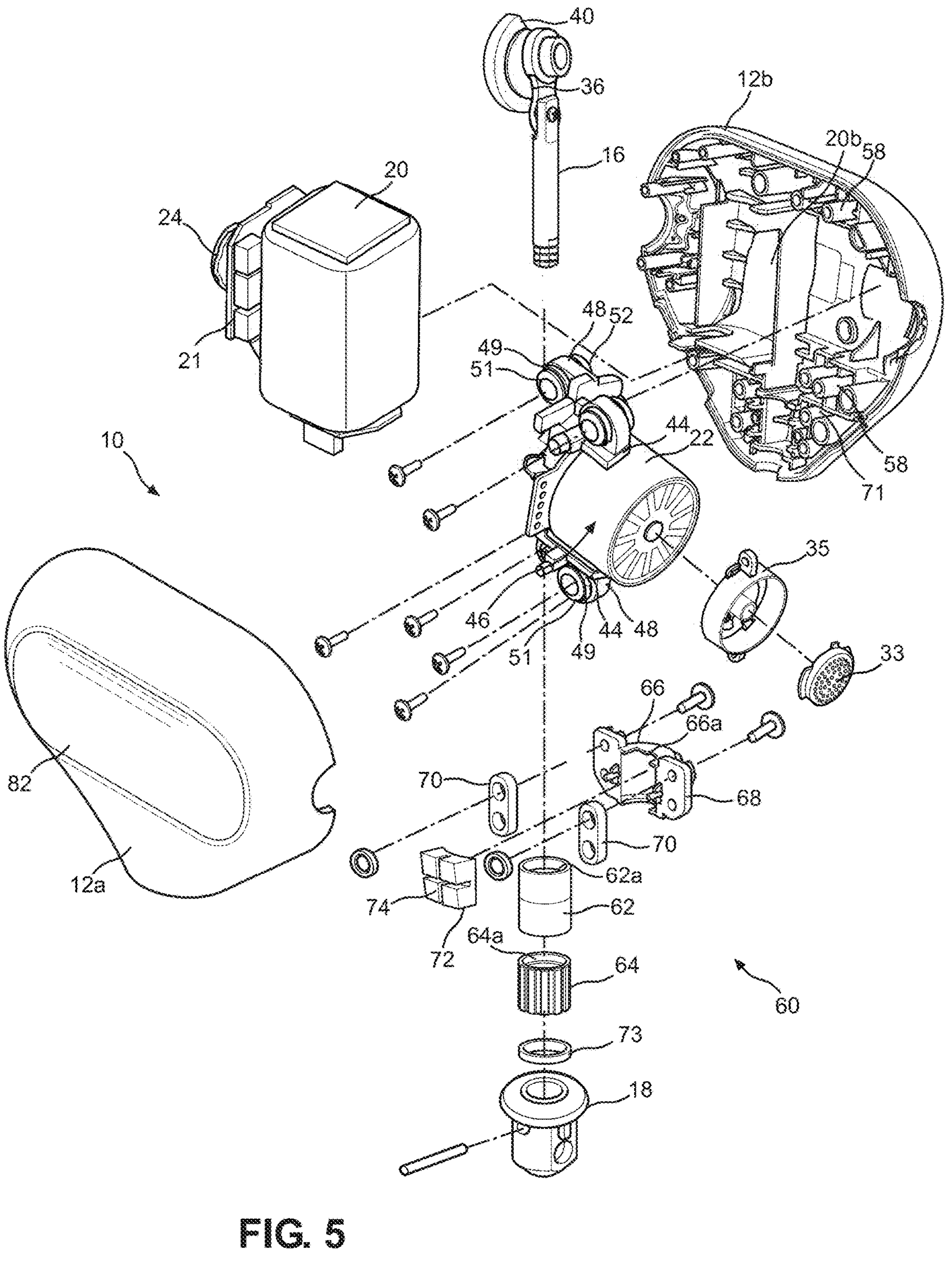
FIG. 5 is an exploded perspective view of the percussive massage device of FIG. 4 including an exploded view of a bush assembly.

In one embodiment, as shown in FIGS. 3-5, dampening rings 51 may be received in tubular members 49 on a first side of the feet 48, and dampening washers 52 may be positioned on the second side of the feet 48. Threaded fasteners 53 or the like may extend through the dampening rings 51, tubular members 49, securing openings 50, and dampening washers 52, and may be received in threaded female securing members 58 on the inner surface of the second housing half 12*b* to secure the motor mount bracket 26 within the housing interior 14. Securing posts 55 (see, e.g., FIG. 3) may be received in corresponding non-threaded female securing members 59 to align and secure the first housing half 12*a* with the second housing half 12*b*. The securing posts 55 may provide an interference fit with the female securing members 59 to secure the first housing half 12*a* to the second housing half 12*b*. In one embodiment, the securing posts 55 may be tapered from the top or free end thereof (or include tapered flanges) to provide the interference fit with the female securing members 59. A dampening member 57 may be positioned between the motor mount bracket 26 and the second housing half 12*b* to prevent direct contact of the motor mount bracket 26 against the second housing half 12*b*. According to some aspects, a pair of dampening members 57 may be positioned between the motor mount bracket 26 and the second housing half 12*b* to prevent direct contact of the motor mount bracket 26 against the second housing half 12*b*, wherein each of the pair of dampening members 57 is spaced apart above and below the motor 22.

In one embodiment, the rotation of the motor shaft 32 may be converted to reciprocating motion of the reciprocating shaft 16 via a linkage assembly (or push rod assembly) 34 that includes a push rod 36 that may be pivotably connected to the reciprocating shaft 16 (via pivot pin 37) and an offset member 38 that may include a counterweight 40. An offset shaft 42 extending from the offset member 38 may be operatively connected (e.g., pivotably connected) to the push rod 36. It will be appreciated that, in some embodiments, the axis of the offset shaft 42 is offset from the axis of rotation of the motor shaft 32. In one embodiment, the push rod 36 (or at least a majority thereof), offset member 38, and counterweight 40 may all be positioned on a first side of the housing interior 14 (i.e., on the same side of the housing interior as the motor).

In one embodiment, as shown in FIGS. 3-5, the reciprocating shaft 16 may extend through and reciprocate within a bush assembly 60 that may generally include a bush 62, a dampening bush cover 64, washer 73, and bush holding structure 66. The bush 62 may be received in the central opening 64*a* of the dampening bush cover 64, which may be received in the central opening 66*a* of the bush holding structure 66. The reciprocating shaft 16 may extend through the central opening 62*a* of bush 62. Dampening screw guides 70 and dampening member 72 (which may have a curved shape) may help damp the reciprocation of the reciprocating shaft 16 through the bush assembly 60. To connect the bush assembly 60 to the housing 12, threaded fasteners may be extended through openings in the dampening screw guides 70, through openings in wings 68 extending from the bush holding structure 66, and into female securing members 71 (see FIG. 4). Dampening member 72 may be positioned between the bush assembly 60 and the second housing half 12*b*. Securing protrusions 74 extending from the dampening member 72 may extend into securing openings 76 formed in the second housing half 12*b*.

Figure 6:
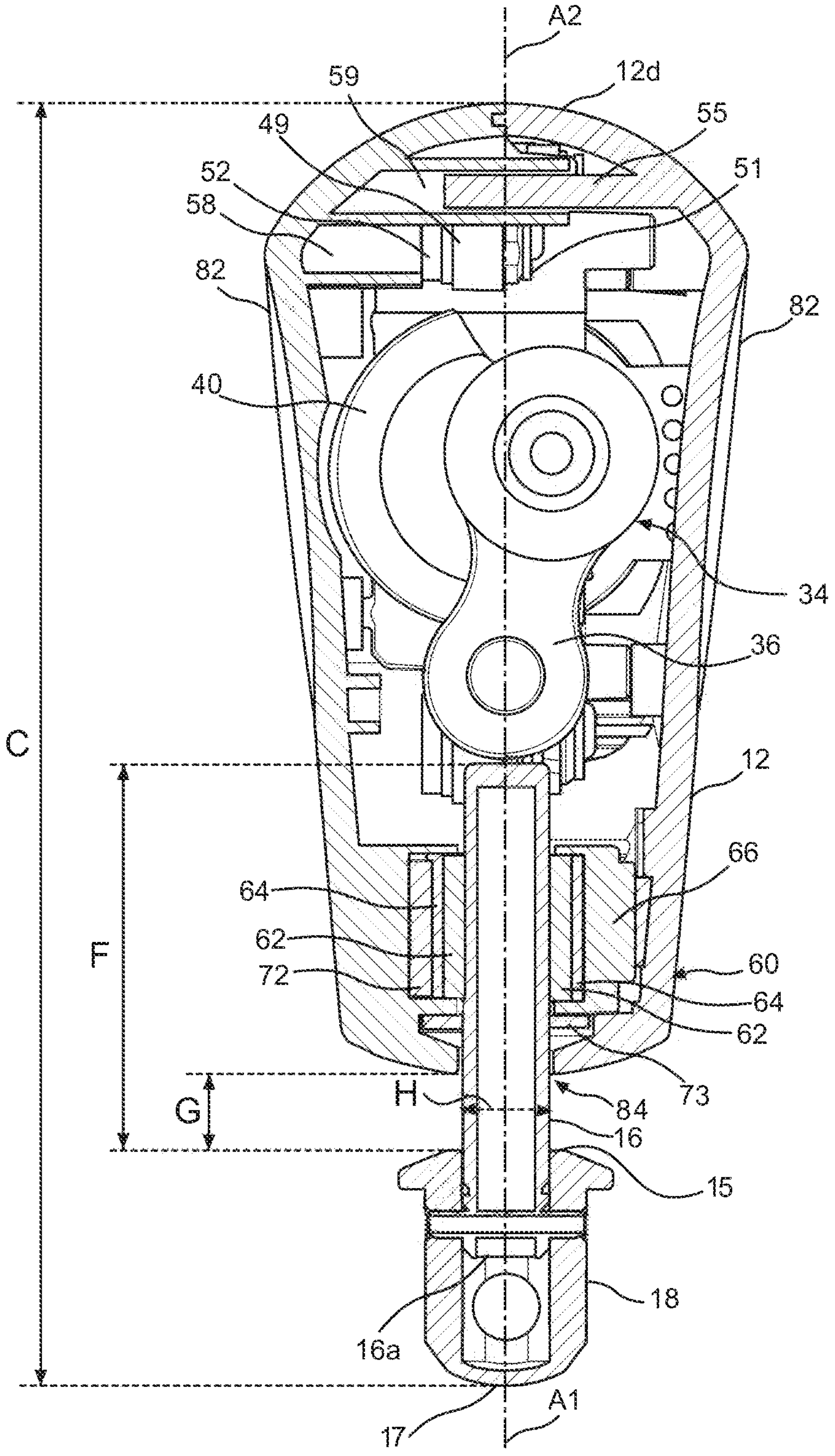
FIG. 6 is a cross-sectional side elevation taken along line 6-6 of FIG. 1.

In one embodiment, as shown in FIGS. 2 and 6, the reciprocating shaft 16 may define a longitudinal reciprocation axis A1. The housing 12 may define a housing axis A2 as illustrated in FIGS. 2 and 6. In one embodiment, the reciprocation axis A1 and the housing axis A2 may be co-axial. As shown in FIG. 2, the housing 12 may include a first side portion 25 and a second side portion 27 that cooperate to form the housing interior 14 and are disposed on opposite sides of the reciprocation axis A1. In one embodiment, the motor 22 may be positioned in the first side portion 25 and the battery 20 may be positioned in the second side portion 27. In some embodiments, the motor 22 and entire drive train 32, 34, 36, 38, prior to the reciprocating shaft 16 (with respect to the drive train), may be positioned in the first side portion 25 (i.e., on the first side of the reciprocation axis A1) and the battery 20, PCB 21 and associated electronic components (other than all wires) and the switch 24 may all be located in the second side portion 27 (i.e., on the second side of the reciprocation axis A1). In the illustrative embodiment shown in FIG. 2, the motor shaft 32 may define a motor axis A3. In one embodiment, the motor axis A3 may be generally perpendicular to the reciprocation axis A1 and may extend through the battery 20. The motor axis A3 may also be co-axial with the switch 24. In one embodiment, the battery may be oriented with a battery axis running along its longest dimension being generally parallel to the reciprocation axis A1.

In one embodiment, as shown in FIGS. 2-5, the first side portion 25 of the housing 12 may also include a vent 33 having a plurality of vent holes operable to provide ventilation to the housing interior 14 and the various components contained therein. The vent holes may be one of circular-shaped, oval-shaped, rectangular-shaped, or square-shaped, among other shapes and any combination of shapes. The vent 33 may have a convex or domed shape, a circular shape, an oval shape, a square shape, or a rectangular shape, among other shapes. The vent 33 may extend through a correspondingly shaped vent opening 33*a* in the housing 12. According to some aspects, the vent 33 may include one of more flanges spaced apart along an outer periphery of the vent, wherein each flange is configured to engage a corresponding recess formed in a respective portion of the housing 12 forming the opening 33*a*. As such, the one or more flanges of the vent 33 may be configured to engage the housing 12 to securely fix the vent 33 within the vent opening 33*a*.

During use of the percussive massage device 10, operation of the motor 22 generates heat which may accumulate within the housing interior 14. Overheating of the motor 22 could cause it to fail. For instance, the buildup of excessive motor heat may cause rapid deterioration of the motor windings and the associated insulation. According to some embodiments, it is therefore desirable to prevent such overheating of the motor from occurring.

In one implementation, the vent 33 may be located near the motor 22 in order to provide sufficient airflow into and out of the housing 12 for dissipating heat generated by the motor 22. More particularly, the vent 33 may facilitate heat dissipation from the motor 22 by allowing cool air into the housing and hot air out of the housing. The vent 33 and the vent opening 33*a* may be co-axially aligned with the motor axis A3 in order to ensure even heat dissipation along an outer surface of the motor 22. The vent 33 may prevent the motor 22 from overheating during use. The vent may also prevent the buildup of heat generated by the motor 22 during use from being distributed amongst the various components arranged within the housing interior 14. Additionally, the vent may prevent the housing 12 itself from getting too hot due to the buildup of heat generated by the motor 22. The user therefore may be able to grasp the housing during use for long periods of time without feeling heat-induced pain or discomfort.

A stabilizer 35 may also be located in the first side portion 25 of the housing 12. More particularly, the stabilizer may be disposed between the vent 33 and the motor 22. According to one implementation, the stabilizer 35 may have a shape generally corresponding to a shape of the motor 22. For instance, the stabilizer 35 may be generally cylindrical and co-axially aligned with the motor axis A3. The stabilizer may include a pair of anchor wings 39 configured to fixedly secure the stabilizer to the housing 12 via respective fasteners, such as screws or bolts. In some aspects, the stabilizer 35 may include an exhaust fan operable to assist with expelling hot air through the vent 33 from within the housing interior 14. In some embodiments, the stabilizer 35 may include a cooling fan configured to cool down the motor 22.

In use, a user may grasp the percussive massage device 10 by placing their hand, and, in particular, their palm against the top 12*d* of the housing 12 (illustratively shown in FIGS. 7 and 8) at a position wherein the reciprocation axis A1 extends through their palm. This may allow the user to provide a push force in line with the reciprocation axis A1. The user may then use the percussive massage device 10 to massage one or more body parts with the removably attached massage attachment 19, and to change attachments as desired. The percussive massage device 10 may be gripped differently if desired. It will be appreciated that the percussive massage device 10 can be paired with different massage attachments.

Figure 8:
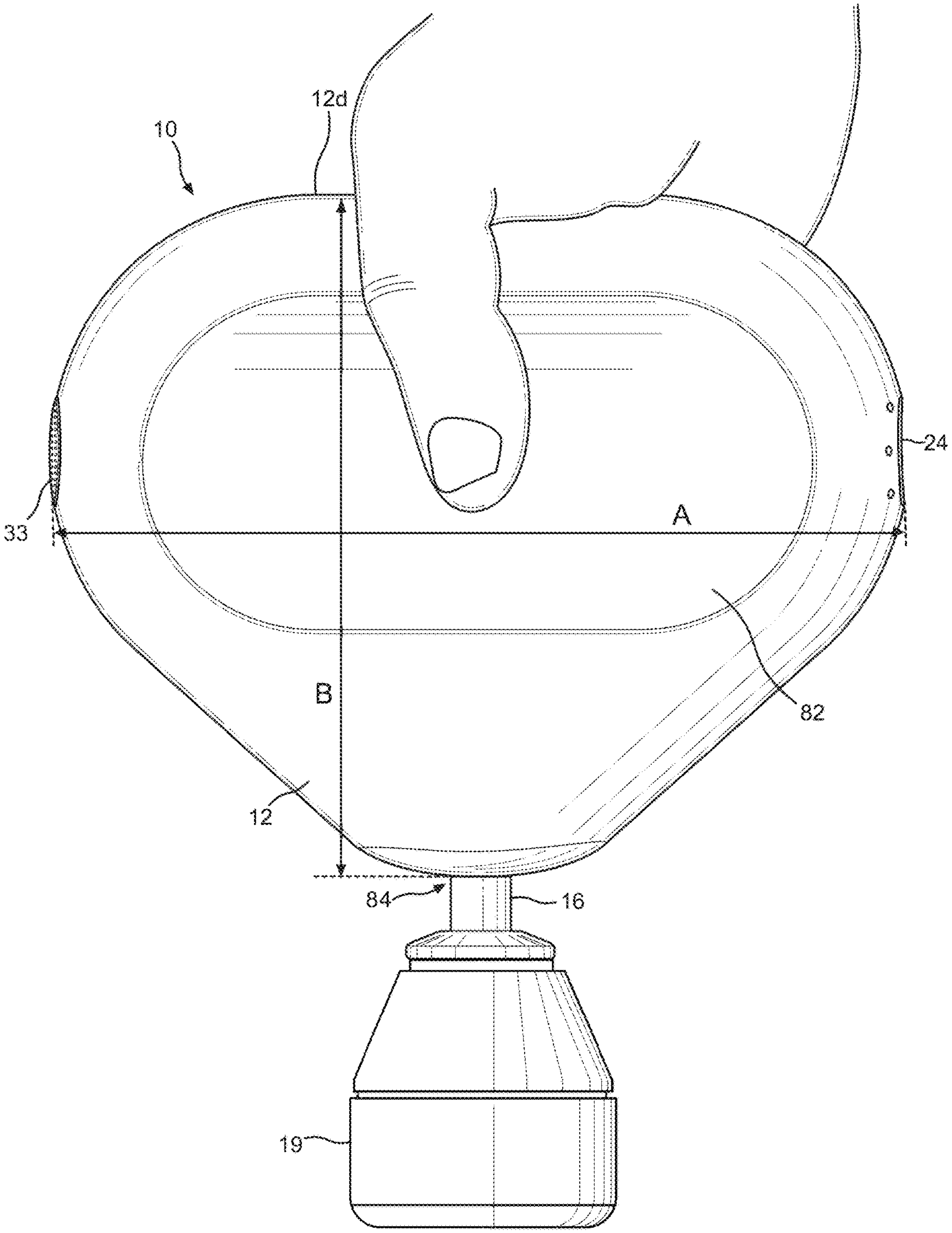
FIG. 8 is a rear elevational view of the percussive massage device being grasped by a user.

In one embodiment, the percussive massage device 10 may be shaped to ergonomically fit into a user's palm, as shown, for example, in FIGS. 7 and 8. In one embodiment, the outer surface 12*c* of the housing 12 may taper (front, back, left side and right side) from the top toward the opening 84 through which the reciprocating shaft 16 extends. In another embodiment, the reciprocating shaft 16 may be completely retained within the housing 12 and does not extend through opening 84. In such an embodiment, the reciprocating shaft 16 may include a female attachment member on the distal end thereof and the massage attachment 19 may include a male attachment member that extends through opening 84 and mates with the female attachment member of the reciprocating shaft 16.

In one embodiment, the housing 12 may include finger recesses 82 on opposite sides where a user may place their fingers on one side and thumb on the other side, as shown, for example, in FIGS. 7 and 8. In one embodiment, the percussive massage device 10 and housing 12 may generally be symmetrical both left and right (as shown in FIGS. 2 and 8) and front and back (as shown in FIGS. 6 and 7).

The percussive massage device 10 may be configured to be more compact than other comparable massage devices. It has been determined that specific sizes, dimensions, and relative sizes and dimensions of the percussive massage device 10 and/or its components may advantageously provide a device 10 that best balances portability and ergonomic for the user with the inclusion of functional components such as, for example, suitable ventilation components to prevent overheating of the internal components. Specifically, the size of the housing 12, as well as the size and the arrangement of the various components located within the housing interior 14, may allow the percussive massage device 10 to be, for example, at least twenty percent smaller than other known percussive massage devices while still including functional components such as, for example, suitable ventilation components. In some embodiments, the housing 12 of the percussive massage device 10 may have maximum width A, a housing height B, maximum depth D, and minimum depth E as shown, for example, in FIGS. 7 and 8. Maximum width A may be measured approximately parallel to motor axis A3 from vent 33 to switch 24 or where the housing 12 extends outwardly away from either the vent 33 and/or switch 24. Housing height B may be measured approximately parallel to housing axis A2 from the top 12*d* of the housing 12 to the opening 84 at the base of the housing 12. Maximum depth D may be measured approximately perpendicular to the housing axis A2 near the top 12*d* of the housing 12 where the housing has largest dimension. Minimum depth E may be measured approximately perpendicular to the housing axis A2 near the opening 84 of the housing 12 where the housing has smallest dimension.

In some embodiments, maximum width A may be, for example, approximately 125 mm. In some embodiments, maximum width A may be between about 115 mm to about 135 mm. In some embodiments, maximum width A may be between about 120 mm to about 130 mm. In some embodiments, housing height B may be, for example, approximately 100 mm. In some embodiments, housing height B may be between about 85 mm to about 108 mm. In some embodiments, housing height B may be between about 95 mm to about 105 mm. In some embodiments, maximum depth D may be, for example, approximately 49 mm. In some embodiments, maximum depth D may be between about 40 mm to about 53 mm. In some embodiments, maximum depth D may be between about 45 mm to about 50 mm. In some embodiments, minimum depth E may be, for example, approximately 34 mm. In some embodiments, minimum depth E may be between about 30 mm to about 38 mm. In some embodiments, minimum depth E may be between about 32 mm to about 36 mm.

As shown for example in FIG. 6, the percussive massage device 10 may have an assembly height C that may be measured approximately parallel to housing axis A2 from the top 12*d* of the housing 12 to the base 17 of the attachment member 18 as shown, for example, in FIG. 6. The assembly height C may vary depending on the position of the reciprocating shaft 16 between a retracted position and an extended position related to how far reciprocating shaft 16 extends through the opening 84. Reciprocating shaft 16 may have length F and diameter H. The top 15 of attachment member 18 may be spaced apart by a distance G from the opening 84 at the base of the housing 12.

In the retracted position, assembly height C may be, for example, approximately 126 mm. In some embodiments of the retracted position, assembly height C may be between about 120 mm and about 131 mm. In some embodiments of the retracted position, assembly height C may be between about 123 mm and about 128 mm. In the extended position, assembly height C may be, for example, approximately 138 mm. In some embodiments of the extended position, assembly height C may be between about 132 mm and about 145 mm. In some embodiments of the extended position, assembly height C may be between about 135 mm and about 141 mm.

In the retracted position, distance G may be, for example, approximately 5 mm. In some embodiments of the retracted position, distance G may be between about 2 mm and about 10 mm. In some embodiments of the retracted position, distance G may be between about 4 mm and about 8 mm. In the extended position, distance G may be, for example, approximately 17 mm. In some embodiments of the extended position, distance G may be between about 12 mm and about 25 mm. In some embodiments of the extended position, distance G may be between about 15 mm and about 20 mm.

Diameter H of reciprocating shaft 16 may be, for example, approximately 9 mm. In some embodiments, reciprocating shaft 16 may have diameter H between about 5 mm and 13 mm. In some embodiments, reciprocating shaft 16 may have diameter H between about 7 mm and 11 mm. Length F of reciprocating shaft 16 may be, for example, approximately 65 mm. In some embodiments, reciprocating shaft 16 may have length F between about 58 mm and 72 mm. In some embodiments, reciprocating shaft 16 may have length F between about 61 mm and 69 mm.

In some embodiments, the assembly height C of the percussive massage device 10 is greater than maximum width A of the housing 12. In some embodiments, the assembly height C of the percussive massage device 10 is greater than the housing height B of the housing 12. In some embodiments, the maximum width A of the housing 12 is greater than the housing height B of the housing 12. In some embodiments, the assembly height C of the percussive massage device 10 is greater than the maximum width A and the housing height B of the housing 12, and the maximum width A is greater than the housing height B of the housing 12. In some embodiment, the maximum depth D of the housing 12 is greater than the minimum depth E of the housing 12.

The small size of the percussive massage device 10 enables the device 10 to also have a low weight. This advantageously allows device 10 to be more portable and easy to maneuver by a user. In some embodiments, the percussive massage device 10 may weigh, for example, approximately 440 grams. In some embodiments, the percussive massage device 10 may weigh, for example, less than 450 grams. In some embodiments, the percussive massage device 10 may weigh between about 300 grams and about 600 grams. In some embodiments, the percussive massage device 10 may weigh between about 400 grams and about 500 grams.

In some implementations, for example, the percussive massage device may include a brushless motor capable of producing the desired torque in a relatively small space. The percussive massage device 10 may be small enough to fit in a jacket pocket, a clothing pocket, a purse, a gym bag, or the like. Furthermore, the percussive massage device 10 may be compactly sized and shaped to ergonomically fit into the palm of a user's hand when held. As such, the user may be able to place a generally linear force from their palm through the housing 12 and to the massage attachment member 18. The generally symmetrical nature of the percussive massage device 10 and the weight distribution of the component parts help make the device easy to manipulate during use.

As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above description using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers or dimensions noted herein are only examples: alternative implementations may employ differing values, measurements, dimensions or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present disclosure. Other measurements can be used. Further, any specific materials noted herein are only examples: alternative implementations may employ differing materials.

These and other changes can be made to the disclosure in light of the above description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. Accordingly, the actual scope of the disclosure encompasses not only the disclosed embodiments, but also all equivalent ways of practicing or implementing the disclosure under the claims.

Accordingly, although exemplary embodiments of the disclosure have been shown and described, it is to be understood that all the terms used herein are descriptive rather than limiting, and that many changes, modifications, and substitutions may be made by one having ordinary skill in the art without departing from the spirit and scope of the disclosure.

What is claimed is:

1. A percussive massage device comprising:

a housing defining a housing interior and a vent opening, wherein the housing comprises a first side portion and a second side portion that are assembled together to form a shell surrounding the housing interior, and the vent opening is defined by a gap between the first side portion and the second side portion bounded by a notch formed in an edge of the first portion such that the notch is contiguous with the gap between the first side portion and the second side portion;

a motor disposed in the housing interior, the motor comprising a rotatable motor shaft, the rotatable motor shaft defining a motor axis;

a battery disposed in the housing interior;

a switch configured to activate the motor; and a reciprocating shaft operatively connected to the rotatable motor shaft, the reciprocating shaft defining a reciprocation axis, and the reciprocating shaft being configured to reciprocate in response to rotation of the rotatable motor shaft.

2. The percussive massage device of claim 1:

wherein the motor is disposed in the first side portion, and wherein the battery is disposed in the second side portion.

3. The percussive massage device of claim 1, wherein the gap is also bounded by a notch formed in an edge of the second side portion.

4. The percussive massage device of claim 1, comprising a vent extending through the vent opening, wherein the vent comprises a plurality of vent holes configured to allow airflow into and out of the housing interior.

5. The percussive massage device of claim 4, wherein the vent holes comprise at least one of circular-shaped, oval-shaped, rectangular-shaped, or square-shaped holes.

6. The percussive massage device of claim 4, wherein the vent further comprises one or more flanges configured to engage the housing to couple the vent to the vent opening.

7. The percussive massage device of claim 4, wherein the vent comprises a convex shape.

8. The percussive massage device of claim 1, wherein the housing defines an opening through which the reciprocating shaft extends and a top, and the housing tapers from the top toward the opening through which the reciprocating shaft extends.

9. The percussive massage device of claim 1, wherein the housing includes an upper portion and a lower portion, wherein the lower portion is narrower and nearer to an opening through which the reciprocation axis extends than the upper portion.

10. The percussive massage device of claim 9, wherein the motor and the battery are positioned within the upper portion.

11. The percussive massage device of claim 9, wherein the lower portion is narrower than the upper portion in a width direction that is parallel to the motor axis.

12. The percussive massage device of claim 11, wherein the reciprocating shaft extends through the lower portion.

13. The percussive massage device of claim 1, comprising a push rod coupling the rotatable motor shaft to the reciprocating shaft, wherein the push rod is configured to rotate on a plane in response to rotation of the rotatable motor shaft, and the motor and the vent opening are both positioned on a same side of the plane.

14. A percussive massage device comprising:

a housing defining a housing interior, a vent opening, and a switch opening, wherein the housing comprises a first side portion and a second side portion that are assembled together to form a shell surrounding the housing interior, the vent opening is defined by a first gap between the first side portion and the second side portion, and the switch opening is defined by a second gap between the first side portion and the second side portion bounded by a notch formed in an edge of the first portion;

a vent received in the vent opening, wherein the vent comprises vent holes;

a motor disposed in the housing interior, the motor comprising a rotatable motor shaft, the rotatable motor shaft defining a motor axis;

a battery disposed in the housing interior;

a switch extending through the switch opening and configured to activate the motor; and a reciprocating shaft operatively connected to the rotatable motor shaft, the reciprocating shaft defining a reciprocation axis extending between the vent opening and the switch, and the reciprocating shaft being configured to reciprocate in response to rotation of the rotatable motor shaft.

15. The percussive massage device of claim 14, wherein the second gap is also bounded by a notch formed in an edge of the second side portion.

16. The percussive massage device of claim 14, comprising a charging port that extends between the edge of the first side portion and an edge of the second side portion.

17. The percussive massage device of claim 14, wherein the switch is a push button configured to actuate in a direction normal to the reciprocation axis.

18. The percussive massage device of claim 14, wherein the switch and the second gap are circular.

19. A percussive massage device comprising:

a housing defining a housing interior and a vent opening;

a motor disposed in the housing interior, the motor comprising a rotatable motor shaft, the rotatable motor shaft defining a motor axis;

a battery disposed in the housing interior;

a switch configured to activate the motor;

a reciprocating shaft operatively connected to the rotatable motor shaft, the reciprocating shaft defining a reciprocation axis, and the reciprocating shaft being configured to reciprocate in response to rotation of the rotatable motor shaft;

a massage attachment connected to a distal end of the reciprocating shaft; and a vent extending through the vent opening of the housing, the vent comprising vent holes and being configured to ventilate the housing interior, wherein the vent comprises one or more flanges extending radially outwardly away from the vent holes and configured to engage the housing to couple the vent to the housing.

20. The percussive massage device of claim 19, wherein the housing comprises a first side portion and a second side portion that are assembled together to form a shell surrounding the housing interior, and the vent opening is defined by a gap between the first side portion and the second side portion bounded by a notch formed in an edge of the first portion.

21. The percussive massage device of claim 19, comprising a counterweight that rotates about the motor axis.

* * * * *